(12) United States Patent
Lee et al.

(10) Patent No.: US 12,347,226 B2
(45) Date of Patent: Jul. 1, 2025

(54) DISPLAY DEVICE AND METHOD OF DRIVING THE SAME

(71) Applicant: SAMSUNG DISPLAY CO., LTD., Yongin-si (KR)

(72) Inventors: Hyundae Lee, Yongin-si (KR); Kangbin Jo, Yongin-si (KR); Ilnam Kim, Yongin-si (KR); Seunghyun Moon, Yongin-si (KR); Heechul Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/509,148

(22) Filed: Nov. 14, 2023

(65) Prior Publication Data
US 2024/0203156 A1 Jun. 20, 2024

(30) Foreign Application Priority Data
Dec. 15, 2022 (KR) ........................ 10-2022-0176123

(51) Int. Cl.
*G09G 3/3233* (2016.01)
*G06V 40/13* (2022.01)

(52) U.S. Cl.
CPC ....... *G06V 40/1318* (2022.01); *G09G 3/3233* (2013.01); *G09G 2300/0426* (2013.01); *G09G 2300/0819* (2013.01); *G09G 2300/0842* (2013.01); *G09G 2300/0861* (2013.01); *G09G 2330/021* (2013.01); *G09G 2354/00* (2013.01); *G09G 2360/144* (2013.01)

(58) Field of Classification Search
CPC .. G06V 40/1318; G06V 40/13; G09G 3/3233; G09G 2300/0426; G09G 2300/0819; G09G 2300/0842; G09G 2300/0861; G09G 2330/021; G09G 2354/00; G09G 2360/144; G09G 3/3208; G09G 3/32; G09G 2360/14; G09G 2310/08; G06F 21/32; H10K 65/00
See application file for complete search history.

(56) References Cited

U.S. PATENT DOCUMENTS

| | | | | |
|---|---|---|---|---|
| 7,843,422 | B1* | 11/2010 | Ludden | G09G 3/3406 345/102 |
| 10,963,661 | B2* | 3/2021 | Zhou | G06V 40/1318 |
| 11,037,526 | B2* | 6/2021 | Facchin | G09G 5/04 |
| 2007/0126727 | A1* | 6/2007 | Chiang | G09G 5/003 345/207 |
| 2008/0143753 | A1* | 6/2008 | Ou-Yang | G09G 3/006 345/207 |

(Continued)

FOREIGN PATENT DOCUMENTS

KR 10-2022-0014351 2/2022

*Primary Examiner* — Jose R Soto Lopez
(74) *Attorney, Agent, or Firm* — F. CHAU & ASSOCIATES, LLC

(57) ABSTRACT

A display device includes a display panel that includes a pixel and a sensor. The pixel includes a pixel driving circuit and an emission element. The sensor includes a sensor driving circuit and a sensing element. The display device also includes a driving circuit that drives the display panel. The sensor selectively operates in a first mode in which a fingerprint is detected and in a second mode in which illumination is detected.

19 Claims, 17 Drawing Sheets

(56) References Cited

U.S. PATENT DOCUMENTS

| | | | |
|---|---|---|---|
| 2008/0204378 A1* | 8/2008 | Park | G09G 3/3208 345/77 |
| 2010/0020052 A1* | 1/2010 | Kim | H04N 21/44213 345/207 |
| 2013/0207949 A1* | 8/2013 | Jiang | G09G 3/36 345/207 |
| 2014/0002887 A1* | 1/2014 | Yeung | G09G 3/3473 359/291 |
| 2014/0292792 A1* | 10/2014 | Chen | G09G 5/10 345/589 |
| 2014/0363093 A1* | 12/2014 | Miller | H04N 19/40 382/235 |
| 2015/0170611 A1* | 6/2015 | Noto | G06F 3/0446 345/173 |
| 2015/0213781 A1* | 7/2015 | Huang | G06F 1/3212 345/207 |
| 2016/0282975 A1* | 9/2016 | Wu | G06F 3/0412 |
| 2016/0321987 A1* | 11/2016 | Oh | G06F 3/0412 |
| 2018/0061313 A1* | 3/2018 | Jang | G06F 1/1643 |
| 2018/0190240 A1* | 7/2018 | Ropo | G09G 3/20 |
| 2018/0306640 A1* | 10/2018 | Pang | G01J 1/0247 |
| 2020/0027392 A1* | 1/2020 | Xu | G09G 3/3266 |
| 2020/0035151 A1* | 1/2020 | Feng | G06V 40/1318 |
| 2020/0111815 A1* | 4/2020 | Lius | G09G 3/3225 |
| 2020/0159385 A1* | 5/2020 | Chung | G06F 3/042 |
| 2020/0160814 A1* | 5/2020 | Han | G09G 3/3208 |
| 2020/0200596 A1* | 6/2020 | Shepelev | G09G 3/20 |
| 2020/0242995 A1* | 7/2020 | Han | G09G 3/32 |
| 2020/0286423 A1* | 9/2020 | Yu | G09G 3/3208 |
| 2020/0394982 A1* | 12/2020 | Zhong | G09G 5/026 |
| 2021/0012711 A1* | 1/2021 | Huang | G09G 3/3291 |
| 2021/0158069 A1* | 5/2021 | Kim | G06V 10/147 |
| 2021/0319735 A1* | 10/2021 | Hong | G09G 3/20 |
| 2021/0333926 A1* | 10/2021 | Wang | G06V 40/1318 |
| 2021/0398463 A1* | 12/2021 | Kim | G09G 5/10 |
| 2022/0013061 A1* | 1/2022 | Hsieh | G09G 3/32 |
| 2022/0114973 A1* | 4/2022 | Lin | G09G 3/2007 |
| 2022/0147730 A1* | 5/2022 | Kim | G06V 40/1365 |
| 2022/0171494 A1* | 6/2022 | Shih | G06F 3/04883 |
| 2022/0197466 A1* | 6/2022 | Chang | G06F 3/0446 |
| 2022/0319381 A1* | 10/2022 | Xiao | G09G 3/2074 |
| 2023/0237948 A1* | 7/2023 | He | G09G 5/10 345/690 |
| 2023/0316800 A1* | 10/2023 | Cheng | G06F 3/0412 382/124 |
| 2023/0317026 A1* | 10/2023 | Takano | G09G 3/3677 345/87 |
| 2024/0013746 A1* | 1/2024 | Ma | G06V 40/1318 |
| 2024/0135854 A1* | 4/2024 | Wen | G09G 5/026 |
| 2024/0221575 A1* | 7/2024 | Wen | G09G 3/2007 |

\* cited by examiner

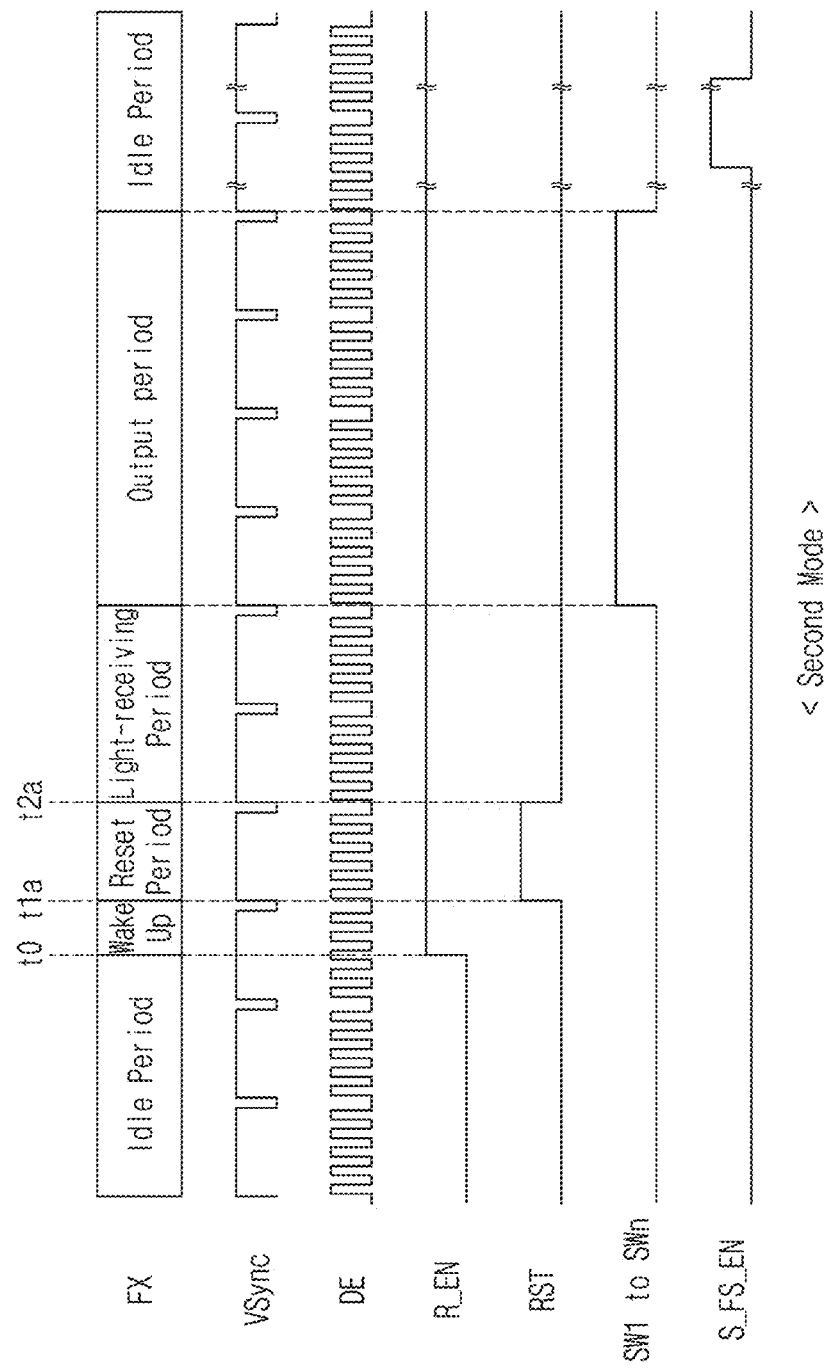

< First Mode >

< Second Mode >

< Second Mode >

DISPLAY DEVICE AND METHOD OF DRIVING THE SAME

CROSS-REFERENCE TO RELATED APPLICATION

This U.S. nonprovisional application claims priority under 35 U.S.C § 119 to Korean Patent Application No. 10-2022-0176123, filed on Dec. 15, 2022 in the Korean Intellectual Property Office, the disclosure of which is hereby incorporated by reference in its entirety.

TECHNICAL FIELD

Embodiments of the present invention relate to a display device and a method of driving the same. More particularly, embodiments of the present invention relate to a display device capable of detecting fingerprint and illumination and a method of driving the same.

DISCUSSION OF RELATED ART

Display devices provide various functions that enable the user to interact with the display device. For example, the display device may display an image to provide information to the user or may sense the user's input. Recent display devices include functions for sensing information (e.g., biometric information) provided from users. Identification of fingerprint may be achieved through a capacitive type method based on a variation in capacitance between electrodes, an optical type method using an optical sensor to detect incident light, or an ultrasonic type method utilizing a piezoelectric material to detect vibration.

SUMMARY

An embodiment of the present invention provides a display device including a sensor capable of detecting a fingerprint and illumination and a method of driving the same.

According to an embodiment of the present invention, a display device includes a display panel that includes a pixel and a sensor, the pixel including a pixel driving circuit and an emission element, and the sensor including a sensor driving circuit and a sensing element, and a driving circuit that drives the display panel. The sensor may selectively operate in a first mode in which a fingerprint is detected and in a second mode in which illumination is detected.

In an embodiment, in the first mode, the sensor may receive light during a first light-receiving period. In the second mode, the sensor may receive light during a second light-receiving period shorter than the first light-receiving period.

In an embodiment, in the first mode, the sensor may sequentially enter a reset period, a light-receiving period, and an output period. In the second mode, the sensor may sequentially enter a reset period and an output period.

In an embodiment, an interval in the first mode between the reset period in a previous frame of the sensor and the reset period in a current frame of the sensor may be greater than an interval in the second mode between the reset period in the previous frame of the sensor and the reset period in the current frame of the sensor.

In an embodiment, the display device may further include a sensing circuit that receives a sensing signal from the sensor driving circuit, a sample-and-hold unit that samples and holds a signal provided from the sensing circuit, and an analog-to-digital converter that converts an analog type signal provided from the sample-and-hold unit to a digital type signal. The sample-and-hold unit may include a reset part that includes a first switch and a first capacitor, and a hold part that includes a second switch and a second capacitor.

In an embodiment, a first length of an on-period of the second switch in the first mode may be greater than a second length of an on-period of the second switch in the second mode.

In an embodiment, the sensor driving circuit may include a reset transistor including a first electrode that receives a reset voltage, a second electrode that is connected to a first sensing node, and a third electrode that receives a reset control signal, an amplification transistor including a first electrode that receives a sensor driving voltage, a second electrode that is connected to a second sensing node, and a third electrode that is connected to the first sensing node, and an output transistor including a first electrode that is connected to the second sensing node, a second electrode that is connected to a readout line, and a third electrode that receives an output control signal.

In an embodiment, a length of an on-period of the second switch in the first mode may be greater than a length of an activation period of the output control signal.

In an embodiment, a length of an on-period of the second switch in the second mode may be less than a length of an activation period of the output control signal.

In an embodiment, a first length of an activation period of the output control signal in the first mode may be greater than a second length of an activation period of the output control signal in the second mode.

In an embodiment, a first length of an on-period of the second switch in the first mode may be the same as a second length of an on-period of the second switch in the second mode.

In an embodiment, the display device may further include a processor that controls an operation of the driving circuit. The processor may provide the driving circuit with a mode control signal including information about an operation mode of the sensor.

In an embodiment, the processor may include a determination unit configured to determine an illumination determining region based on a sensing image obtained by the sensor, an image analyzer configured to obtain a digital value from the illumination determining region of the sensing image, to normalize the digital value, and to obtain the normalized digital value, and an illumination detector configured to detect illumination based on the normalized digital value.

In an embodiment, in the first mode, the sensor may use a first illumination region to detect the fingerprint. In the second mode, the sensor may use a second illumination region wider than the first illumination region to detect the illumination.

According to an embodiment of the present invention, a method of driving a display device including a display panel that includes a pixel and a sensor, the pixel including a pixel driving circuit and an emission element, and the sensor including a sensor driving circuit and a sensing element, includes receiving a mode selection signal, detecting fingerprint when the mode selection signal includes information that causes the sensor to operate in a first mode, and detecting illumination when the mode selection signal includes information that causes the sensor to operate in a second mode.

In an embodiment, when the sensor operates in the first mode, the sensor may sequentially enter a reset period, a light-receiving period, and an output period. When the sensor operates in the second mode, the sensor may sequentially enter a reset period and an output period.

In an embodiment, when the sensor operates in the first mode, the sensor may receive light during a first light-receiving period. When the sensor operates in the second mode, the sensor may receive light during a second light-receiving period shorter than the first light-receiving period.

In an embodiment, the sensor driving circuit may include a reset transistor including a first electrode that receives a reset voltage, a second electrode that is connected to a first sensing node, and a third electrode that receives a reset control signal, an amplification transistor including a first electrode that receives a sensor driving voltage, a second electrode that is connected to a second sensing node, and a third electrode that is connected to the first sensing node, and an output transistor including a first electrode that is connected to the second sensing node, a second electrode that is connected to a readout line, and a third electrode that receives an output control signal.

In an embodiment, a first length of an activation period of the output control signal in the first mode may be greater than a second length of an activation period of the output control signal in the second mode.

In an embodiment, the method of claim may further include receiving a sensing signal from the sensor driving circuit, sampling and holding the sensing signal, and converting the sensing signal of an analog type to a digital type. A first length of a first period in the first mode may be greater than a second length of a second period in the second mode. The sensing signal may be sampled and held in each of the first period and the second period.

In an embodiment, in the first mode, the first length of the first period may be greater than a length of an activation period of the output control signal. In the second mode, the second length of the second period may be less than a length of an activation period of the output control signal.

In an embodiment, the method may further include determining an illumination determining region based on a sensing image obtained by the sensor, obtaining a digital value from the illumination determining region of the sensing image, normalizing the digital value to obtain a normalized digital value, and detecting illumination based on the normalized digital value.

BRIEF DESCRIPTION OF THE DRAWINGS

The above and other features of the present invention will become more apparent by describing in detail embodiments thereof with reference to the accompanying drawings.

FIG. 8 illustrates a waveform diagram showing an operation of a sensor according to an embodiment of the present invention.

DETAILED DESCRIPTION OF EMBODIMENTS

Figure 1:
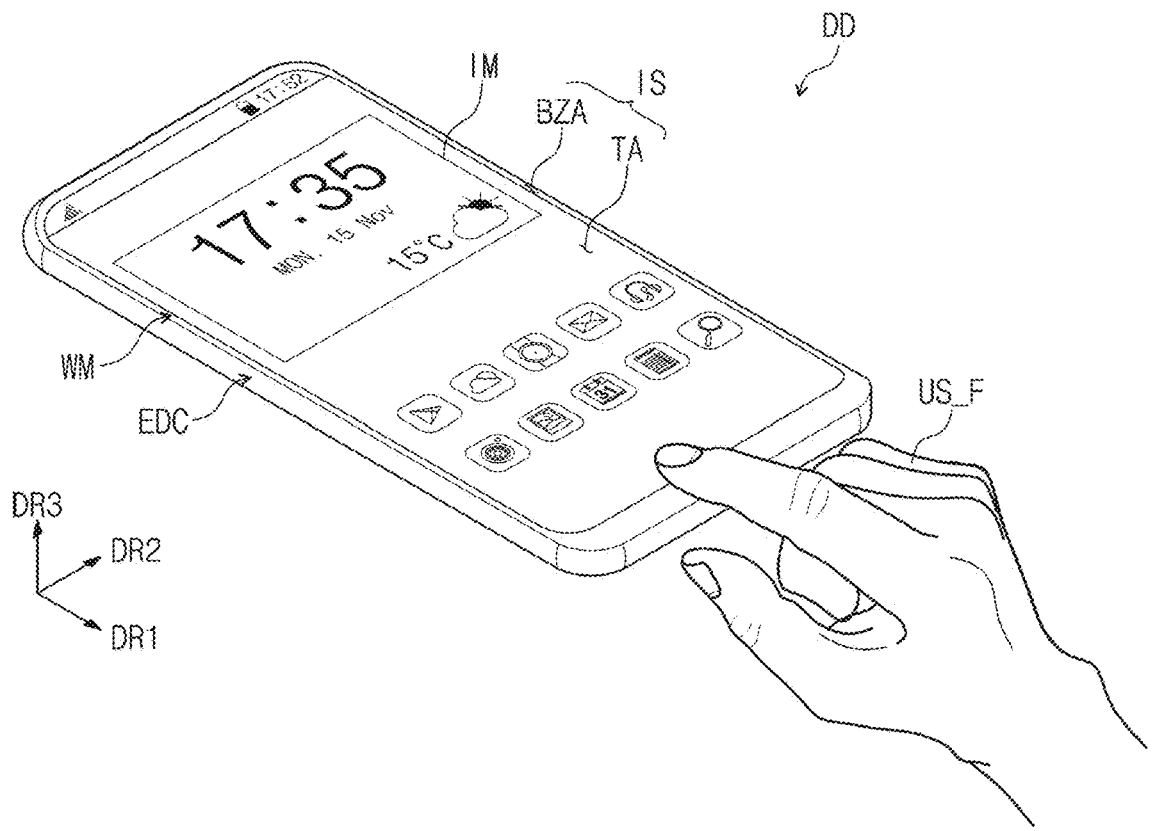
FIG. 1 illustrates a perspective view showing a display device according to an embodiment of the present invention.

Embodiments of the present invention will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The term "and/or" includes one or more combinations defined by associated components.

It will be understood that the terms "first," "second," "third," etc. are used herein to distinguish one element from another, and the elements are not limited by these terms. Thus, a "first" element in an embodiment may be described as a "second" element in another embodiment. Unless the context clearly indicates otherwise, the singular forms are intended to include the plural forms as well.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

The term "part" or "unit" refers to a software component or a hardware component for performing a specific function. The hardware component may include, for example, a field-programmable gate array (FPGA) or an application-specific integrated circuit (ASIC). The software component may refer to data used by an executable code and/or an executable code in an addressable storage medium. Thus, the software components may be, for example, object-oriented software component, class component, and task component and may include processes, functions, attributes, procedures, subroutines, program code segments, drivers, firmware, microcode, circuits, data, databases, data structures, tables, arrays, or variables.

Figure 2:
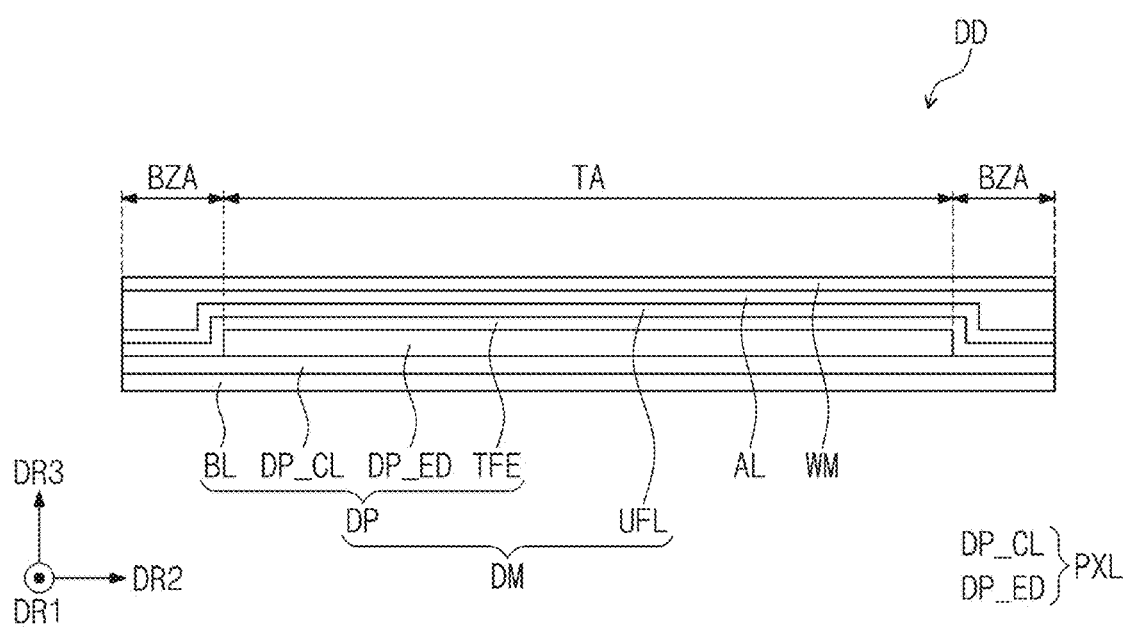
FIG. 2 illustrates a cross-regional view showing a display device according to an embodiment of the present invention.

FIG. 1 illustrates a perspective view showing a display device DD according to an embodiment of the present invention. FIG. 2 illustrates a cross-regional view showing the display device DD according to an embodiment of the present invention.

Referring to FIGS. 1 and 2, the display device DD may be an apparatus that is activated with electrical signals. For example, the display device DD may be a mobile phone, a tablet computer, an automotive navigation system, a game console, or a wearable apparatus, but the present invention is not limited thereto. FIG. 1 depicts by way of example a mobile phone as an example of the display device DD.

In addition, FIG. 1 exemplarily shows a rigid type display device DD, but the present invention is not limited thereto. For example, the display device DD may be a display apparatus that is of a foldable, rollable, or slidable type.

A top surface of the display device DD may be defined as a display surface IS, and the display surface IS may have a plane defined by a first direction DR1 and a second direction DR2. The display surface IS may provide users with images IM generated by the display device DD.

A third direction DR3 may be defined to indicate a normal direction substantially perpendicular to the plane defined by the first direction DR1 and the second direction DR2. In this description, the phrase "when viewed on a plane" may mean "when viewed in the third direction DR3." For example, the plane may be parallel to a surface defined by the first direction DR1 and the second direction DR2.

The display surface IS may be divided into a transmission area TA and a bezel area BZA. The transmission area TA may be a region on which the images IM are displayed. A user may recognize the images IM through the transmission area TA. In an embodiment, the transmission area TA is illustrated to have rounded tetragonal shapes at vertices thereof. This, however, is illustrated by way of example, and the shape of the transmission area TA is not limited thereto. For example, according to embodiments, the transmission area TA may have a rectangular shape, a circular shape, a square shape, or any other suitable shapes.

The bezel area BZA may be adjacent to the transmission area TA. The bezel area BZA may have a certain color. The bezel area BZA may surround the transmission area TA. Therefore, the bezel area BZA may substantially define the shape of the transmission area TA. This, however, is illustrated by way of example, and the bezel area BZA may be disposed adjacent to only one side of the transmission area TA or may be omitted according to embodiments.

The display device DD may detect an external input that is externally applied (e.g., that is applied from a source external to the display device DD). The external input may include any suitable types of input applied from outside of the display device DD. For example, the external input may include the touch of a user's hand or other body part, as well as any input (e.g., hovering touch) that approaches or is in the vicinity of the display device DD. In addition, the external input may include, for example, force, pressure, temperature, light, or any other external inputs. The external input may be provided by a separate device, for example, an active pen or a digitizer pen. In addition, the display device DD may detect a user's biometric information provided by the user, or may measure surrounding brightness. As shown in FIG. 1, the external input may be provided by the finger US_F of a user.

An outer appearance of the display device DD may be formed by a window WM and a housing EDC. For example, the window WM and the housing EDC may be combined with each other and may accommodate other components such as a display module DM (see FIG. 2) of the display device DD.

A front surface of the window WM may define the display surface IS. The window WM may include an optically transparent dielectric material. For example, the window WM may include glass or plastic. The window WM may have a multi-layered or single-layered structure. For example, the window WM may include either a plurality of plastic films that are coupled to each other through an adhesive or a glass substrate with a plastic film coupled thereto through an adhesive.

The housing EDC may include a material whose rigidity is relatively high. For example, the housing EDC may include glass, plastic, and metal, or may include a plurality of frames and/or a plurality of plates, each frame or plate including any combination of glass, plastic, and metal. The housing EDC may stably protect, from external impact, components of the display device DD that are accommodated in an internal space of the housing EDC. According to embodiments, a battery module may be included, for example, between the display module DM and the housing EDC, which may provide power utilized for an overall operation of the display device DD.

As shown in FIG. 2, the display module DM may include a display panel DP and an upper functional layer UFL.

The display panel DP may be a component that substantially generates an image. The display panel DP may be an emissive display panel, for example, an organic light-emitting display panel, an inorganic light-emitting display panel, a quantum-dot display panel, a micro-LED display panel, or a nano-LED display panel. The following will describe an example in which an organic light-emitting display panel is adopted as the display panel DP.

The display panel DP may include a base layer BL, a pixel layer PXL, and an encapsulation layer TFE. The display panel DP according to embodiments of the present invention may be a flexible display panel or a rigid display panel. For example, the display panel DP may be a foldable display panel that is foldable about a folding axis, a rollable display panel at least a portion of which is rollable around a rotation axis, or a slidable display panel.

The base layer BL may include a synthetic resin layer. The synthetic resin layer may be a polyimide-based resin layer, but the material of the synthetic resin layer is not particularly limited. The base layer BL may include one or more of, for example, a glass substrate, a metal substrate, and an organic/inorganic composite substrate.

The pixel layer PXL may be disposed on the base layer BL. The pixel layer PXL may include a circuit layer DP_CL and an element layer DP_ED.

The circuit layer DP_CL may be disposed between the base layer BL and the element layer DP_ED. The circuit layer DP_CL may include at least one dielectric layer and a circuit element. In this disclosure, the dielectric layer included in the circuit layer DP_CL may be called an intermediate dielectric layer. The intermediate dielectric layer may include at least one intermediate inorganic layer and at least one intermediate organic layer.

Figure 3:
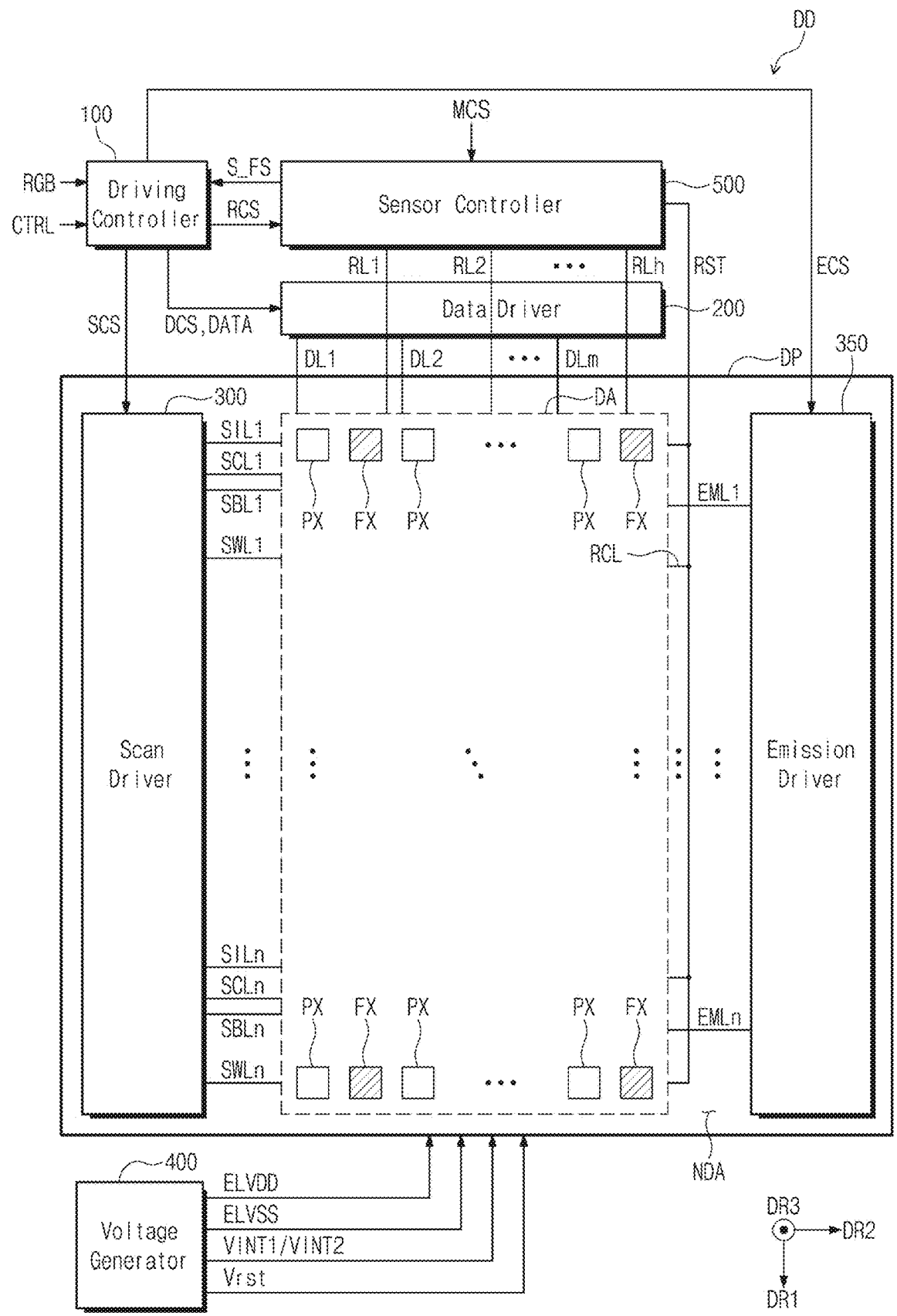
FIG. 3 illustrates a block diagram showing a display device according to an embodiment of the present invention.

The circuit element may include a pixel driving circuit (see PDC of FIG. 4A) included in each of a plurality of pixels (see PX of FIG. 3) for displaying an image, and may also include a sensor driving circuit (see O_SD of FIG. 4A) included in each of a plurality of sensors (see FX of FIG. 3). The circuit layer DP_CL may further include signal lines connected to the pixel driving circuit PDC and/or the sensor driving circuit O_SD. In an embodiment of the present invention, each of the plurality of sensors FX may operate in a first mode in which a fingerprint is detected and in a second mode in which illumination is detected, and this will be further described in detail below.

The element layer DP_ED may include an emission element (ED of FIG. 4A) included in each of the pixels PX, and may also include a light sensing element (see OPD of FIG. 4A) included in each of the sensors FX. In an embodiment of the present invention, the light sensing element OPD may be a photodiode, for example, an organic photodiode. The light sensing element OPD may be a sensor that detects light reflected from a user's fingerprint or that responds to light. The circuit layer DP_CL and the element layer DP_ED will be further described in detail below with reference to FIG. 4B.

The encapsulation layer TFE may encapsulate the element layer DP_ED. The encapsulation layer TFE may include at least one organic layer and at least one inorganic layer. The inorganic layer may include an inorganic material and may protect the element layer DP_ED against moisture and oxygen. The inorganic layer may include, for example, a silicon nitride layer, a silicon oxynitride layer, a silicon oxide layer, a titanium oxide layer, or an aluminum oxide layer, but the present invention is not particularly limited thereto. The organic layer may include an organic material and may protect the element layer DP_ED against foreign substances such as dust particles.

The upper functional layer UFL may be disposed on the display panel DP. A series of processes may be employed to form the upper functional layer UFL on the display panel DP, but the present invention is not limited thereto.

The upper functional layer UFL may include a sensor layer that detects coordinates of external inputs and an antireflection layer that may reduce a reflectance of external light that is externally incident. The sensor layer may be disposed on the display panel DP, and the antireflection layer may be disposed on the sensor layer. The present invention, however, is not limited thereto. For example, according to embodiments, the upper functional layer UFL may include only one of the sensor layer and the antireflection layer.

The antireflection layer may include color filters, a black matrix, and a planarization layer. The color filters may have a certain arrangement. For example, the color filters may be arranged in consideration of emission colors of pixels included in the display panel DP. In an embodiment, the antireflection layer may include a black matrix and a reflection control layer. The reflection control layer may selectively absorb some wavelength range of light that is reflected within or incident on the display panel DP and/or an electronic apparatus. In an embodiment, the antireflection layer may be a polarization film.

An adhesion layer AL may further be included in the display device DD according to an embodiment of the present invention. The window WM may be attached through the adhesion layer AL to the upper functional layer UFL. The adhesion layer AL may include, for example, an optically clear adhesive, an optically clear adhesive resin, or a pressure sensitive adhesive (PSA).

FIG. 3 illustrates a block diagram showing the display device DD according to an embodiment of the present invention.

Referring to FIG. 3, the display device DD may include a display panel DP, a panel driver (also referred to as a driving circuit), and a driving controller 100. In an embodiment of the present invention, the panel driver may include a data driver 200, a scan driver 300, an emission driver 350, a voltage generator 400, and a sensor controller 500.

The display panel DP may include a display area DA that corresponds to the transmission area (see TA of FIG. 1) and a non-display area NDA that corresponds to the bezel area (see BZA of FIG. 1).

The display panel DP may include a plurality of pixels PX disposed in the display area DA and a plurality of sensors FX disposed in the display area DA. In an embodiment of the present invention, each of the plurality of sensors FX may be disposed between two pixels PX that neighbor each other. The plurality of pixels PX and the plurality of sensors FX may be alternately disposed in the first direction DR1 and the second direction DR2. The present invention, however, is not limited thereto. For example, according to embodiments, two or more pixels PX may be disposed between two sensors FX that are adjacent to each other in the first direction DR1, or two or more pixels PX may be disposed between two sensors FX that are adjacent to each other in the second direction DR2.

The display panel DP may further include initialization scan lines SIL1 to SILn, compensation scan lines SCL1 to SCLn, write scan lines SWL1 to SWLn, black scan lines SBL1 to SBLn, emission control lines EML1 to EMLn, data lines DL1 to DLm, and readout lines RL1 to RLh, where n and h are positive integers.

The initialization scan lines SIL1 to SILn, the compensation scan lines SCL1 to SCLn, the write scan lines SWL1 to SWLn, the black scan lines SBL1 to SBLn, and the emission control lines EML1 to EMLn may extend in the second direction DR2. The initialization scan lines SIL1 to SILn, the compensation scan lines SCL1 to SCLn, the write scan lines SWL1 to SWLn, the black scan lines SBL1 to SBLn, and the emission control lines EML1 to EMLn may be arranged spaced apart from each other in the first direction DR1. The data lines DL1 to DLm and the readout lines RL1 to RLh may extend in the first direction DR1 and may be arranged spaced apart from each other in the second direction DR2.

The plurality of pixels PX may be correspondingly electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, and the data lines DL1 to DLm. For example, each of the plurality of pixels PX may be electrically connected to four scan lines. However, the number of scan lines connected to each pixel PX may be variously changed without being limited thereto.

The plurality of sensors FX may be correspondingly electrically connected to the readout lines RL1 to RLh. One sensor FX may be electrically connected to one scan line, for example, one of the write scan lines SWL1 to SWLn. The present invention, however, is not limited thereto. For example, according to embodiments, there may be a change in the number of scan lines connected to each sensor FX.

In an embodiment of the present invention, the number of the readout lines RL1 to RLh may correspond to about half the number of the data lines DL1 to DLm. The present invention, however, is not limited thereto. Alternatively, the number of the readout lines RL1 to RLh may correspond to about ¼ or ⅛ of the number of the data lines DL1 to DLm according to embodiments.

The driving controller 100 may receive an image signal RGB and a control signal CTRL. The driving controller 100 may convert a data format of the image signal RGB into an image data signal DATA suitable for interface specification with the data driver 200. The driving controller 100 may output a first control signal SCS, a second control signal ECS, a third control signal DCS, and a fourth control signal RCS.

The data driver 200 may receive the third control signal DCS and the image data signal DATA from the driving controller 100. The data driver 200 may convert the image data signal DATA into data signals, and may output the data signal to the plurality of data lines DL1 to DLm. The data signals may be analog voltages that correspond to grayscale levels of the image data signal DATA.

The scan driver 300 may receive the first control signal SCS from the driving controller 100. In response to the first control signal SCS, the scan driver 300 may output scan signals to scan lines. For example, in response to the first control signal SCS, the scan driver 300 may output initialization scan signals to the initialization scan lines SIL1 to SILn and compensation scan signals to the compensation scan lines SCL1 to SCLn. In addition, in response to the first control signal SCS, the scan driver 300 may output write scan signals to the write scan lines SWL1 to SWLn and black scan signals to the black scan lines SBL1 to SBLn.

The scan driver 300 may be disposed in the non-display area NDA of the display panel DP. The present invention, however, is not particularly limited thereto. For example, at least a portion of the scan driver 300 may be disposed in the display area DA.

The emission driver 350 may be disposed in the non-display area NDA of the display panel DP. The emission driver 350 may receive the second control signal ECS from the driving controller 100. In response to the second control signal ECS, the emission driver 350 may output emission control signals to the emission control lines EML1 to EMLn.

Alternatively, the scan driver 300 may be connected to the emission control lines EML1 to EMLn. In this case, the scan driver 300 may output emission control signals to the emission control lines EML1 to EMLn.

The voltage generator 400 may generate voltages utilized to drive the display panel DP. In an embodiment, the voltage generator 400 may generate a first driving voltage ELVDD, a second driving voltage ELVSS, a first initialization voltage VINT1, a second initialization voltage VINT2, and a reset voltage Vrst.

The sensor controller 500 may receive the fourth control signal RCS from the driving controller 100. In addition, the sensor controller 500 may receive a mode control signal MCS. The mode control signal MCS may be provided from a processor (see AP of FIG. 13A). This, however, is merely by way of example, and the mode control signal MCS may be provided from the processor AP through the driving controller 100 to the sensor controller 500.

In accordance with information included in the mode control signal MCS, the sensor controller 500 may operate in a first mode in which a fingerprint is detected or in a second mode in which illumination is detected. For example, the sensors FX controlled by the sensor controller 500 may operate in the first mode to detect a fingerprint or in the second mode to detect illumination.

In response to the fourth control signal RCS, the sensor controller 500 may receive sensing signals from the readout lines RL1 to RLh. The sensor controller 500 may process the sensing signals received from the readout lines RL1 to RLh and may provide the driving controller 100 with processed sensing signals S_FS.

Figure 4A:
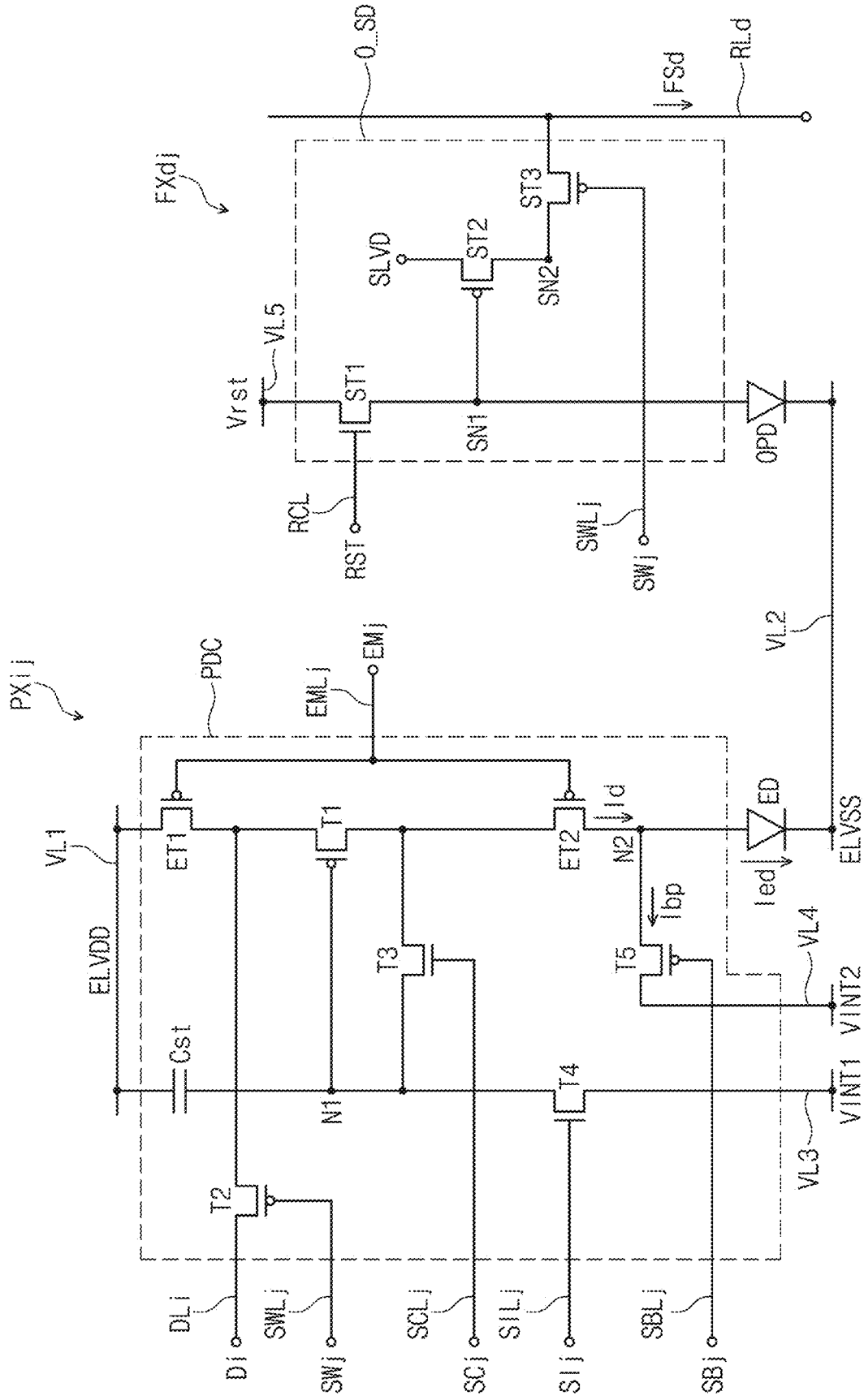
FIG. 4A illustrates an equivalent circuit diagram showing a pixel and a sensor according to an embodiment of the present invention.

FIG. 4A illustrates an equivalent circuit diagram showing a pixel PXij and a sensor FXdj according to an embodiment of the present invention, in which i, j, d and j are positive integers.

FIG. 4A depicts, by way of example, an equivalent circuit diagram showing one pixel PXij of the plurality of pixels (see PX of FIG. 3). As the plurality of pixels PX have the same circuit structure, the circuit structure of the pixel PXij will be described in detail below as a representative example, and for convenience of explanation, a detailed description of other pixels PX will be omitted. In addition, FIG. 4A depicts, by way of example, an equivalent circuit diagram showing one sensor FXdj of the plurality of sensors FX illustrated in FIG. 3. As the plurality of sensors FX have the same circuit structure, the circuit structure of the sensor FXdj will be described in detail below as a representative example, and for convenience of explanation, a detailed description of other sensors FX will be omitted.

Referring to FIGS. 3 and 4A, the pixel PXij may be coupled to an $i^{th}$ data line DLi of the data lines DL1 to DLm, a $j^{th}$ initialization scan line SILj of the initialization scan lines SIL1 to SILn, a $j^{th}$ compensation scan line SCLj of the compensation scan lines SCL1 to SCLn, a $j^{th}$ write scan line SWLj of the write scan lines SWL1 to SWLn, a $j^{th}$ black scan line SBLj of the black scan lines SBL1 to SBLn, and a $j^{th}$ emission control line EMLj of the emission control lines EML1 to EMLn.

The pixel PXij may include an emission element ED and a pixel driving circuit PDC. The emission element ED may be a light-emitting diode. In an embodiment of the present invention, the emission element ED may be an organic light-emitting diode including an organic light-emitting layer, but the present invention is not particularly limited thereto.

The pixel driving circuit PDC may include first to fifth transistors T1, T2, T3, T4, and T5, first and second emission control transistors ET1 and ET2, and one capacitor Cst.

At least one of the transistors T1 to T5, ET1, and ET2 may be a transistor having a low-temperature polycrystalline silicon (LTPS) semiconductor layer. At least one of the transistors T1 to T5, ET1, and ET2 may be a transistor having an oxide semiconductor layer. For example, the third and fourth transistors T3 and T4 may be oxide semiconductor transistors, and the first, second, and fifth transistors T1, T2, and T5 and the first and second emission control transistors ET1 and ET2 may be LTPS transistors.

For example, the first transistor T1 that directly affects brightness of the display device (see DD of FIG. 1) may be configured to include a semiconductor layer formed of polycrystalline silicon having high reliability, and therefore the display device DD may achieve a high resolution. As an oxide semiconductor has high carrier mobility and low leakage current, there may be no large voltage drop even when a driving time is long. For example, a low-frequency operation may be possible because there is no large color change in an image caused by voltage drop even in the low-frequency operation. Since an oxide semiconductor has low leakage current as described above, an oxide semiconductor may be adopted to form at least one of the fourth transistor T4 and the third transistor T3 connected to a gate of the first transistor T1, such that it may be possible not only to prevent or reduce a leakage current that can be introduced to the gate electrode, but also to reduce a consumption power.

Among the first to fifth transistors T1 to T5 and the first and second emission control transistors ET1 and ET2, some may be a p-type transistor and others may be an n-type transistor. For example, in an embodiment, the first, second, and fifth transistors T1, T2, and T5, and the first and second emission control transistors ET1 and ET2 may be p-type transistors, and the third and fourth transistors T3 and T4 may be n-type transistors.

A configuration of the pixel driving circuit PDC according to embodiments of the present invention is not limited to the embodiment depicted in FIG. 4A. The pixel driving circuit PDC depicted in FIG. 4A is a merely an example, and the configuration of the pixel driving circuit PDC may be variously changed. For example, in an embodiment, all of the first to fifth transistors T1 to T5 and the first and second emission control transistors ET1 and ET2 may be p-type transistors or n-type transistors.

The $j^{th}$ initialization scan line SILj, the $j^{th}$ compensation scan line SCLj, the $j^{th}$ write scan line SWLj, the $j^{th}$ black scan line SBLj, and the $j^{th}$ emission control line EMLj may provide the pixel PXij with a $j^{th}$ initialization scan signal SIj, a $j^{th}$ compensation scan signal SCj, a $j^{th}$ write scan signal SWj, a $j^{th}$ black scan signal SBj, and a $j^{th}$ emission control signal EMj, respectively. The $i^{th}$ data line DLi may transmit an $i^{th}$ data signal Di to the pixel PXij. The $i^{th}$ data signal Di may have a voltage level that corresponds to the image signal RGB that is input to the display device (see DD of FIG. 3).

The first driving voltage ELVDD and the second driving voltage ELVSS may be transmitted to the pixel PXij through a first driving voltage line VL1 and a second driving voltage line VL2, respectively. In addition, the first initialization voltage VINT1 and the second initialization voltage VINT2 may be transmitted to the pixel PXij through a first initialization voltage line VL3 and a second initialization voltage line VL4, respectively.

The first transistor T1 may be coupled between the emission element ED and the first driving voltage line VL1 to which the first driving voltage ELVDD is applied. The first transistor T1 may include a first electrode that is connected through the first emission control transistor ET1 to the first driving voltage line VL1, a second electrode that is connected through the second emission control transistor ET2 to an anode (see AE of FIG. 4B) of the emission element ED, and a third electrode (e.g., a gate electrode) that is connected to an end (e.g., a first node N1) of the capacitor Cst. The first transistor T1 may supply the emission element ED with a driving current Id by receiving the $i^{th}$ data signal Di that is transmitted through the $i^{th}$ data line DLi in accordance with a switching operation of the second transistor T2.

The second transistor T2 may be coupled between the $i^{th}$ data line DLi and the first electrode of the first transistor T1. The second transistor T2 may include a first electrode that is connected to the $i^{th}$ data line DLi, a second electrode that is connected to the first electrode of the first transistor T1, and a third electrode (e.g., a gate electrode) that is connected to the $j^{th}$ write scan line SWLj. The second transistor T2 may be turned on with the $j^{th}$ write scan signal SWj transmitted through the $j^{th}$ write scan line SWLj, and may then provide the first electrode of the first transistor T1 with the $i^{th}$ data signal Di transmitted from the $i^{th}$ data line DLi.

The third transistor T3 may be coupled between the first node N1 and the second electrode of the first transistor T1. The third transistor T3 may include a first electrode that is connected to the third electrode of the first transistor T1, a second electrode that is connected to the second electrode of the first transistor T1, and a third electrode (e.g., a gate electrode) that is connected to the $j^{th}$ compensation scan line SCLj. The third transistor T3 may be turned on with the $j^{th}$ compensation scan signal SCj transmitted through the $j^{th}$ compensation scan line SCLj, and may then connect to each other the third and second electrodes of the first transistor T1 to thereby diode-connect the first transistor T1.

The fourth transistor T4 may be coupled between the first node N1 and the first initialization voltage line VL3 to which the first initialization voltage VINT1 is applied. The fourth transistor T4 may include a first electrode that is connected to the first initialization voltage line VL3 through which the first initialization voltage VINT1 is transmitted, a second electrode that is connected to the first node N1, and a third electrode (e.g., a gate electrode) that is connected to the $j^{th}$ initialization scan line SILj. The fourth transistor T4 may be turned on with the $j^{th}$ initialization scan signal SIj transmitted through the $j^{th}$ initialization scan line SILj. The turned-on fourth transistor T4 may provide the first node N1 with the first initialization voltage VINT1 to initialize a potential of the third electrode of the first transistor T1 (or a potential of the first node N1).

The first emission control transistor ET1 may include a first electrode that is connected to first driving voltage line VL1, a second electrode that is connected to the first electrode of the first transistor T1, and a third electrode (e.g., a gate electrode) that is connected to the $j^{th}$ emission control line EMLj.

The second emission control transistor ET2 may include a first electrode that is connected to the second electrode of the first transistor T1, a second electrode that is connected to an anode (see AE of FIG. 4B) of the emission element ED, and a third electrode (e.g., a gate electrode) that is connected to the $j^{th}$ emission control line EMLj.

The first and second emission control transistors ET1 and ET2 may be simultaneously turned on with the $j^{th}$ emission control signal EMj transmitted through the $j^{th}$ emission control line EMLj. The first driving voltage ELVDD applied through the turned-on first emission control transistor ET1 may be compensated by the diode-connected first transistor T1 and may then be transmitted to the emission element ED.

The fifth transistor T5 may include a first electrode that is connected to the second initialization voltage line VL4 through which the second initialization voltage VINT2 is transmitted, a second electrode that is connected to the second electrode of the second initialization control transistor ET2, and a third electrode (e.g., a gate electrode) that is connected to the $j^{th}$ black scan line SBLj. The second initialization voltage VINT2 may have a voltage level the same as or less than the first initialization voltage VINT1.

As described above, one end of the capacitor Cst may be connected to the third electrode of the first transistor T1, and another end of the capacitor Cst may be connected to the first driving voltage line VL1. A cathode (see CE of FIG. 4B) of the emission element ED may be connected to the second driving voltage line VL2 through which the second driving voltage ELVSS is transmitted. The second driving voltage ELVSS may have a voltage level less than the first driving voltage ELVDD.

The sensor FXdj may be coupled to a $d^{th}$ readout line RLd of the readout lines RL1 to RLh, the $j^{th}$ write scan line SWLj (or an output control line), and a reset control line RCL.

The sensor FXdj may include a light sensing element OPD (or a sensing element) and a sensor driving circuit O_SD.

The light sensing element OPD may be a photodiode. In an embodiment of the present invention, the light sensing element OPD may be an organic photodiode in which an organic material is included as a photoelectric conversion layer. The light sensing element OPD may have an anode (see AE1 of FIG. 4B) connected to a first sensing node SN1 and a cathode (see CE of FIG. 4B) connected to the second driving voltage line VL2 through which the second driving voltage ELVSS is transmitted. FIG. 4A depicts by way of example that the sensor FXdj includes one light sensing element OPD, but the present invention is not particularly limited thereto. For example, the sensor FXdj may include z numbers of light sensing elements that are connected in parallel to each other, where z is an integer equal to or greater than 2.

The sensor driving circuit O_SD may include three transistors ST1, ST2, and ST3. The three transistors ST1, ST2, and ST3 may include a reset transistor ST1, an amplification transistor ST2, and an output transistor ST3. At least one of the reset transistor ST1, the amplification transistor ST2, and the output transistor ST3 may be an oxide semiconductor transistor. In an embodiment of the present invention, the reset transistor ST1 may be an oxide semiconductor transistor, and the amplification transistor ST2 and the output transistor ST3 may be LTPS transistors. The present invention, however, is not limited thereto. For example, according to embodiments, at least the reset transistor ST1 and the output transistor ST3 may be oxide semiconductor transistors, and the amplification transistor ST2 may be an LTPS transistor.

In addition, among the reset transistor ST1, the amplification transistor ST2, and the output transistor ST3, at least one may be a p-type transistor and at least another may be an n-type transistor. In an embodiment of the present invention, the amplification transistor ST2 and the output transistor ST3 may be p-type transistors, and the reset transistor ST1 may be an n-type transistor. The present invention, however, is not limited thereto. For example, according to embodiments, all of the reset transistor ST1, the amplification transistor ST2, and the output transistor ST3 may be n-type transistors or p-type transistors.

The sensor driving circuit O_SD according to embodiments of the present invention may have a circuit configuration that is not limited to that of FIG. 4A. The sensor driving circuit O_SD depicted in FIG. 4A is merely an example, and the configuration of the sensor driving circuit O_SD may be variously changed.

The reset transistor ST1 may include a first electrode that is connected to the third initialization voltage line VL5 and receives the reset voltage Vrst, a second electrode that is connected to the first sensing node SN1, and a third electrode that receives a reset control signal RST. In response to the reset control signal RST, the reset transistor ST1 may reset a potential of the first sensing node SN1 to the reset voltage Vrst. The reset control signal RST may be a signal provided through the reset control line RCL.

The amplification transistor ST2 may include a first electrode that receives a sensing driving voltage SLVD, a second electrode that is connected to a second sensing node SN2, and a third electrode that is connected to the first sensing node SN1. The amplification transistor ST2 may be turned on with a potential of the first sensing node SN1 to apply the sensing driving voltage SLVD to the second sensing node SN2. In an embodiment of the present invention, the sensing driving voltage SLVD may be one of the first driving voltage ELVDD, the first initialization voltage VINT1, and the second initialization voltage VINT2. When the sensing driving voltage SLVD is the first driving voltage ELVDD, the first electrode of the amplification transistor ST2 may be electrically connected to the first driving voltage line VL1. When the sensing driving voltage SLVD is the first initialization voltage VINT1, the first electrode of the amplification transistor ST2 may be electrically connected to the first initialization voltage line VL3, and when the sensing driving voltage SLVD is the second initialization voltage VINT2, the first electrode of the amplification transistor ST2 may be electrically connected to the second initialization voltage line VL4.

The output transistor ST3 may include a first electrode that is connected to the second sensing node SN2, a second electrode that is connected to the $d^{th}$ readout line RLd, and a third electrode that receives an output control signal. In response to the output control signal, the output transistor ST3 may transmit a sensing signal to the $d^{th}$ readout line RLd. The output control signal may be called the $j^{th}$ write scan signal SWj (or a $j^{th}$ output control signal) provided through the $j^{th}$ write scan line SWLj. For example, the output transistor ST3 may receive the output control signal, or the $j^{th}$ write scan signal SWj provided from the $j^{th}$ write scan line SWLj.

A reset period may be defined to indicate an activation period (or a high-level period) of the reset control line RCL. The reset transistor ST1 may be turned on when a high-level reset control signal RST is supplied through the reset control line RCL. Alternatively, when the reset transistor ST1 is a PMOS transistor, during the reset period, a low-level reset control signal RST is supplied to the reset control line RCL. During the reset period, the first sensing node SN1 may be reset to a potential that corresponds to the reset voltage Vrst. In an embodiment of the present invention, the reset voltage Vrst may have a voltage level less than the second driving voltage ELVSS.

The light sensing element OPD of the sensor FXdj may be exposed to light during an emission period of the emission element ED. A voltage of the first sensing node SN1 may be kept as the reset voltage Vrst during the reset period, and when the light sensing element OPD is exposed to light, the voltage of the first sensing node SN1 may be gradually shifted to the second driving voltage ELVSS. The amplification transistor ST2 may be a source follower amplifier configured to produce a source-drain current in proportion to an amount of charges of the first sensing node SN1 that are input to the third electrode of the amplification transistor ST2.

During an output period, the output transistor ST3 may be supplied with a low-level $j^{th}$ write scan signal SWj through the $j^{th}$ write scan line SWLj. When the output transistor ST3 is turned on in response to the low-level $j^{th}$ write scan signal SWj, the $d^{th}$ readout line RLd may receive a sensing signal FSd that corresponds to a current flowing through the amplification transistor ST2.

Figure 4B:
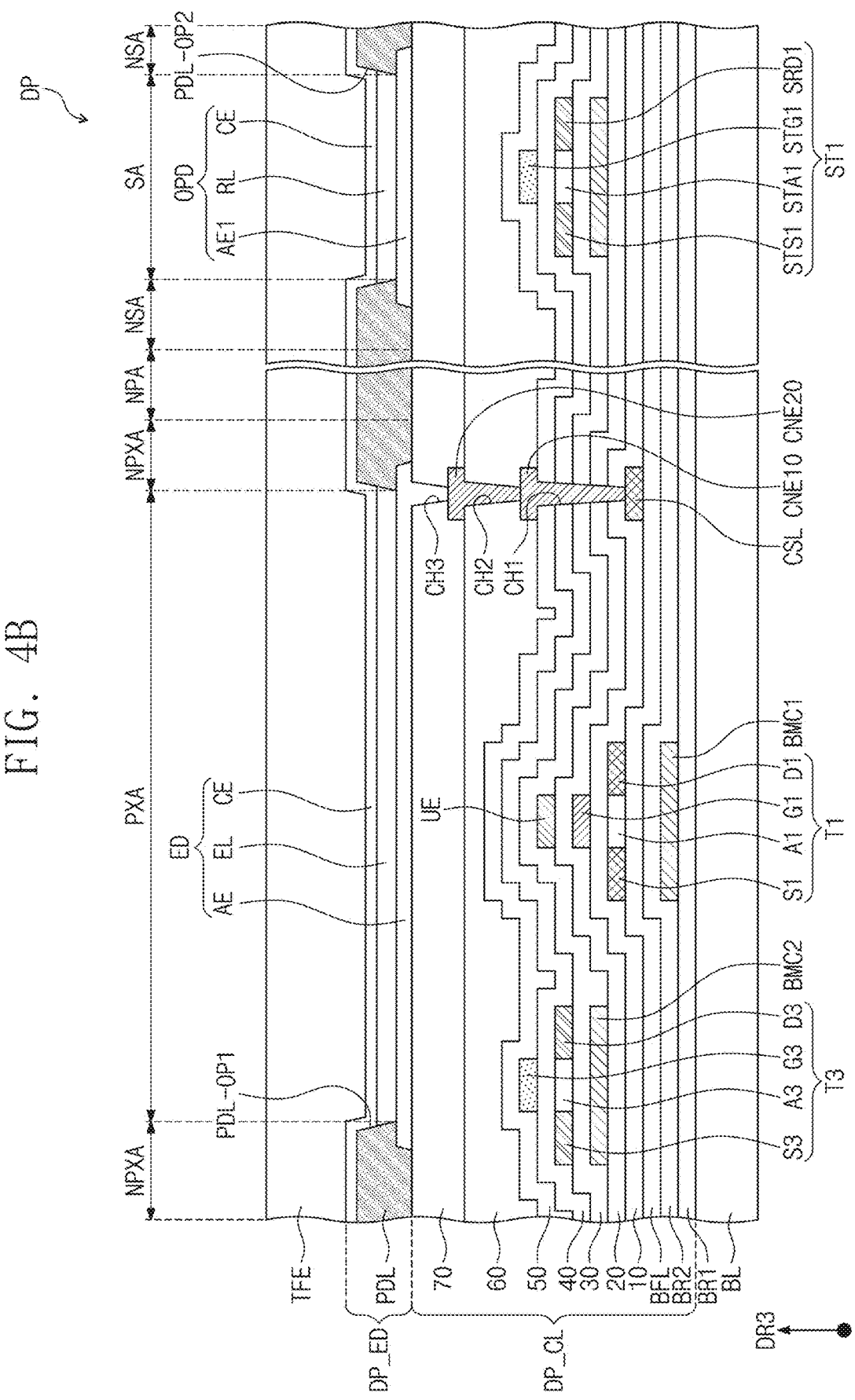
FIG. 4B illustrates a cross-regional view showing a display panel according to an embodiment of the present invention.

FIG. 4B illustrates a cross-regional view showing the display panel DP according to an embodiment of the present invention.

Referring to FIGS. 4A and 4B, the display panel DP may include a base layer BL and may also include a circuit layer DP_CL, an element layer DP_ED, and an encapsulation layer TFE that are disposed on the base layer BL.

At least one inorganic layer may be formed on a top surface of the base layer BL. The inorganic layer may include at least one of, for example, oxide, titanium oxide, silicon oxide, silicon oxynitride, zirconium oxide, and hafnium oxide. The inorganic layer may be formed multi-layered. The multi-layered inorganic layer may constitute barrier layers BR1 and BR2 and/or a buffer layer BFL which will be described below. The barrier layers BR1 and BR2 and the buffer layer BFL may be selectively disposed.

The barrier layers BR1 and BR2 may prevent introduction of foreign substances from outside of the display device DD. The barrier layers BR1 and BR2 may include a silicon oxide layer and a silicon nitride layer. Each of the silicon oxide layer and the silicon nitride layer may be provided in plural, and the silicon oxide layers and the silicon nitride layers may be alternately stacked.

The barrier layers BR1 and BR2 may include a first barrier layer BR1 and a second barrier layer BR2. A first backside metal layer BMC1 may be disposed between the first barrier layer BR1 and the second barrier layer BR2. In an embodiment of the present invention, the first backside metal layer BMC1 may be omitted.

The buffer layer BFL may be disposed on the barrier layers BR1 and BR2. The buffer layer BFL may increase a bonding force between the base layer BL and at least one of a semiconductor pattern and a conductive pattern. The buffer layer BFL may include, for example, a silicon oxide layer and a silicon nitride layer. The silicon oxide layer and the silicon nitride layer may be alternately stacked.

A first semiconductor pattern may be disposed on the buffer layer BFL. The first semiconductor pattern may include a silicon semiconductor. The silicon semiconductor may include, for example, amorphous silicon or polycrystalline silicon. The first semiconductor pattern may include, for example, low-temperature polycrystalline silicon.

Although FIG. 4B depicts that a portion of the first semiconductor pattern is disposed on the buffer layer BFL, another portion of the first semiconductor pattern may further be disposed on another region. The first semiconductor pattern may be arranged according to a specific rule over pixels. The first semiconductor pattern may have electrical properties that are changed based on whether the first semiconductor pattern is doped. The first semiconductor pattern may include a first region whose conductivity is high and a second region whose conductivity is low (e.g., relatively lower than the first region). The first region may be doped with n-type or p-type impurities. A p-type transistor may include a doped region implanted with p-type impurities, and an n-type transistor may include a doped region implanted with n-type impurities. The second region may be an undoped region or may be a doped region implanted with impurities whose concentration is less than that of impurities doped in the first region.

The first region may have a conductivity greater than that of the second region, and may substantially serve as an electrode or a signal line. The second region may substantially correspond to an active region (or channel) of a transistor. For example, a portion of the first semiconductor pattern may be an active region of a transistor, another portion of the first semiconductor pattern may be a source or drain of the transistor, and still another portion of the first semiconductor pattern may be a connection electrode or a connection signal line.

A first electrode S1, a channel part A1, and a second electrode D1 of the first transistor T1 may be formed from the first semiconductor pattern. The first electrode S1 and the second electrode D1 of the first transistor T1 may extend in opposite directions from the channel part A1.

FIG. 4B depicts a portion of a connection signal line CSL formed from the first semiconductor pattern. When viewed on a plane, the connection signal line CSL may be connected to the second electrode of the fifth transistor (see T5 of FIG. 4A).

A first dielectric layer 10 may be disposed on the buffer layer BFL. The first dielectric layer 10 may overlap in common a plurality of pixels and may cover the first semiconductor pattern. The first dielectric layer 10 may be one or more of an inorganic layer and an organic layer, and may have a single-layered or multi-layered structure. The first dielectric layer 10 may include at least one of, for example, aluminum oxide, titanium oxide, silicon oxide, silicon nitride, silicon oxynitride, zirconium oxide, and hafnium oxide. In an embodiment, the first dielectric layer 10 may be a single-layered silicon oxide layer. Similar to the first dielectric layer 10, a subsequently described dielectric layer of the circuit layer DP_CL may be an inorganic layer and/or an organic layer, and may have a single-layered or multi-layered structure. The inorganic layer may include at least one of the materials mentioned above, but the present invention is not limited thereto.

A third electrode G1 of the first transistor T1 may be disposed on the first dielectric layer 10. The third electrode G1 may be a portion of a metal pattern. The third electrode G1 of the first transistor T1 may overlap the channel part A1 of the first transistor T1. The third electrode G1 of the first transistor T1 may serve as a mask in a process where the first semiconductor pattern is doped. The third electrode G1 may include one or more of, for example, titanium (Ti), silver (Ag), a silver-containing alloy, molybdenum (Mo), a molybdenum-containing alloy, aluminum (Al), an aluminum-containing alloy, aluminum nitride (AlN), tungsten (W), tungsten nitride (WN), copper (Cu), indium tin oxide (ITO), and indium zinc oxide (IZO), but the present invention is not particularly limited thereto.

The first dielectric layer 10 may be provided thereon with a second dielectric layer 20 that covers the third electrode G1 of the first transistor T1. The second dielectric layer 20 may be one or more of an inorganic layer and an organic layer, and may have a single-layered or multi-layered structure. The second dielectric layer 20 may include at least one of, for example, silicon oxide, silicon nitride, and silicon oxynitride. In an embodiment, the second dielectric layer 20 may have a multi-layered structure including a silicon oxide layer and a silicon nitride layer.

An upper electrode UE and a second backside metal layer BMC2 may be disposed on the second dielectric layer 20. The upper electrode UE may overlap the third electrode G1. The upper electrode UE may be a portion of a metal pattern. The capacitor (see Cst of FIG. 4A) may be defined by a portion of the third electrode G1 and the upper electrode UE that overlaps the portion of the third electrode G1. In an embodiment of the present invention, the second dielectric layer 20 may be replaced with a dielectric pattern. In this case, the upper electrode UE may be disposed on the dielectric pattern, and may serve as a mask when the dielectric pattern is formed from the second dielectric layer 20.

The second backside metal layer BMC2 may be disposed below an oxide thin film transistor, for example, the third transistor T3. The second backside metal layer BMC2 may be supplied with a constant voltage or a signal. In an embodiment of the present invention, the second backside metal layer BMC2 may be omitted.

The second dielectric layer 20 may be provided thereon with a third dielectric layer 30 that covers the upper electrode UE and the second backside metal layer BMC2. The third dielectric layer 30 may have a single-layered or multi-layered structure. For example, the third dielectric layer 30 may have a multi-layered structure including a silicon oxide layer and a silicon nitride layer.

A second semiconductor pattern may be disposed on the third dielectric layer 30. The second semiconductor pattern may include an oxide semiconductor. The oxide semiconductor may include a plurality of regions that are divided based on whether metal oxide is reduced. A region (or reducing region) where metal oxide is reduced may have conductivity greater than that of a region (or non-reducing region) where metal oxide is not reduced. The reducing region may substantially serve as a signal line or a source/drain of a transistor. The non-reducing region may substantially correspond to an active region (or semiconductor region or channel) of a transistor. For example, a portion of the second semiconductor pattern may be an active region of a transistor, another portion of the second semiconductor pattern may be a source/drain region of the transistor, and still another portion of the second semiconductor pattern may be a signal transfer region.

A first electrode S3, a channel part A3, and a second electrode D3 of the third transistor T3 may be formed from the second semiconductor pattern. The first electrode S3 and the second electrode D3 may include metal reduced from a metal oxide semiconductor. When viewed in a vertical section, the first electrode S3 and the second electrode D3 may extend in opposite directions from the channel part A3.

A fourth dielectric layer 40 may be disposed on the third dielectric layer 30. The fourth dielectric layer 40 may overlap in common a plurality of pixels and may cover the second semiconductor pattern. The fourth dielectric layer 40 may include at least one of, for example, aluminum oxide, titanium oxide, silicon oxide, silicon nitride, silicon oxynitride, zirconium oxide, and hafnium oxide.

A third gate G3 of the third transistor T3 may be disposed on the fourth dielectric layer 40. The third electrode G3 may be a portion of a metal pattern. The third electrode G3 of the third transistor T3 may overlap the channel part A3 of the third transistor T3. The third electrode G3 may serve as a mask in a process where the second semiconductor pattern is doped. In an embodiment of the present invention, the fourth dielectric layer 40 may be replaced with a dielectric pattern.

The fourth dielectric layer 40 may be provided thereon with a fifth dielectric layer 50 that covers the third electrode G3. The fifth dielectric layer 50 may be an inorganic layer.

A first connection electrode CNE10 may be disposed on the fifth dielectric layer 50. The first connection electrode CNE10 may be coupled to the connection signal line CSL through a contact hole CH1 that penetrates the first to fifth dielectric layers 10 to 50.

A sixth dielectric layer 60 may be disposed on the fifth dielectric layer 50. The sixth dielectric layer 60 may be an organic layer. The organic layer may include a general universal polymer such as, for example, benzocyclobutene (BCP), polyimide, hexamethyldisiloxane (HMDSO), polymethylmethacrylate (PMMA), and polystyrene (PS), a polymer derivative having a phenol group, an acryl-based polymer, an imide-based polymer, an aryl ether-based polymer, an amide-based polymer, a fluoride-based polymer, a p-xylene-based polymer, a vinyl alcohol-based polymer, or any blend thereof, but the present invention is not particularly limited thereto.

A second connection electrode CNE20 may be disposed on the sixth dielectric layer 60. The second connection electrode CNE20 may be coupled to the first connection electrode CNE10 through a second contact hole CH2 that penetrates the sixth dielectric layer 60. The sixth dielectric layer 60 may be provided thereon with a seventh dielectric layer 70 that covers the second connection electrode CNE20. The seventh dielectric layer 70 may be an organic layer.

A first electrode layer may be disposed on the circuit layer DP_CL. A pixel definition layer PDL may be formed on the first electrode layer. The first electrode layer may include an anode AE of the emission element ED and an anode AE1 of the light sensing element OPD. The seventh dielectric layer 70 may be provided thereon with the anode AE of the emission element ED and the anode AE1 of the light sensing element OPD. The anode AE of the emission element ED may be connected to the second connection electrode CNE20 through a third contact hole CH3 that penetrates the seventh dielectric layer 70.

The pixel definition layer PDL may have first and second layer openings PDL-OP1 and PDL-OP2 disposed therein. The first layer opening PDL-OP1 may expose at least a portion of the anode AE of the emission element ED. The second layer opening PDL-OP2 may expose at least a portion of the anode AE1 of the light sensing element OPD.

In an embodiment of the present invention, the pixel definition layer PDL may further include a black colored material. The pixel definition layer PDL may further include a black organic dye/pigment such as carbon black or aniline black. The pixel definition layer PDL may be formed by mixing a blue organic material and a black organic material. The pixel definition layer PDL may further include a liquid-repellent organic material.

As shown in FIG. 4B, the display panel DP may include an emission area PXA and a non-emission area NPXA adjacent to the emission area PXA. The non-emission area NPXA may surround the emission area PXA. In an embodiment, the emission area PXA may be defined to correspond to a portion of the anode AE exposed by the first layer opening PDL-OP1.

An emission layer EL may be disposed on the anode AE of the emission element ED. The emission layer EL may be disposed in a region that corresponds to the first layer opening PDL-OP1. The emission layer EL may generate certain colored light. Although a patterned emission layer EL is exemplarily explained in an embodiment described here, a single luminous layer may be disposed in common on a plurality of emission areas. In this case, the luminous layer may generate white light or blue light. In addition, the luminous layer may have a multi-layered structure called a tandem structure.

The emission layer EL may include a light-emitting material, for example, a small-molecular organic material or a polymeric organic material. Alternatively, the emission layer EL may include a quantum-dot material such as a light-emitting material. A quantum-dot core may be selected from, for example, II-VI group compounds, III-V group compounds, IV-VI group compounds, IV group elements, IV group compounds, and any combination thereof.

A cathode CE may be disposed on the emission layer EL. In an embodiment of the present invention, the cathode CE may be disposed in common on the emission area PXA, non-emission area NPXA, and a non-pixel area NPA.

The circuit layer DP_CL may further include a sensor driving circuit (see O_SD of FIG. 4A). The reset transistor ST1 of the sensor driving circuit O_SD is illustrated in the interest of convenience of description. The reset transistor ST1 may include a first electrode STS1, a channel part STA1, and a second electrode SRD1 that are formed from the second semiconductor pattern. The first electrode STS1 and the second electrode SRD1 may include metal reduced from a metal oxide semiconductor. The fourth dielectric layer 40 may be disposed to cover the first electrode STS1, the channel part STA1, and the second electrode SRD1 of the reset transistor ST1. A third electrode STG1 of the reset transistor ST1 may be disposed on the fourth dielectric layer 40. In an embodiment, the third electrode STG1 may be a portion of a metal pattern. The third electrode STG1 of the reset transistor ST1 may overlap the channel part STA1 of the reset transistor ST1.

In an embodiment of the present invention, the reset transistor ST1 may be located at the same layer as that of the third transistor T3. For example, the first electrode STS1, the channel part STA1, and the second electrode SRD1 of the reset transistor ST1 may be formed in the same process used for forming the first electrode S3, the channel part A3, and the second electrode D3 of the third transistor T3. The third electrode STG1 of the reset transistor ST1 may be simultaneously formed in the same process used for forming the third electrode G3 of the third transistor T3. The first electrodes and the second electrodes of the amplification transistor ST2 and the output transistor ST3 of the sensor driving circuit O_SD may be formed in the same process used for forming the first electrode S1 and the second electrode D1 of the first transistor T1. As the reset transistor ST1 and the third transistor T3 are formed on the same layer in the same process, no additional process may be performed to form the reset transistor ST1, and thus, process efficiency may be increased and to process cost may be reduced according to embodiments.

The circuit layer DP_ED may further include a light sensing element OPD.

The light sensing element OPD may include an anode AE1, a photoelectric conversion layer RL, and a cathode CE. The anode AE1 of the light sensing element OPD may be located at the same layer as that of the anode AE of the emission element ED. For example, the anode AE1 may be disposed on the circuit layer DP_CL, and may be formed in the same process used for forming the anode AE of the emission element ED.

The second layer opening PDL-OP2 of the pixel definition layer PDL may expose at least a portion of the anode AE1. The photoelectric conversion layer RL may be disposed on the anode AE1 exposed by the second layer opening PDL-OP2. The photoelectric conversion layer RL may include an organic photo sensing material. The cathode CE may be disposed on the photoelectric conversion layer RL. Each of the anode AE1 and the cathode CE may receive an electrical signal. The anode AE1 and the cathode CE may receive different electrical signals from each other. Therefore, a certain electric field may be created between the anode AE1 and the cathode CE. The photoelectric conversion layer RL may generate an electrical signal that corresponds to light incident on the sensor (see FX of FIG. 3).

Charges generated by the photoelectric conversion layer RL may change the electric field formed between the anode AE1 and the cathode CE. An amount of charges generated by the photoelectric conversion layer RL may depend on incidence of light onto the light sensing element OPD and an amount and intensity of light incident onto the light sensing element OPD. Therefore, there may be a change in electric field formed between the anode AE1 and the cathode CE. The light sensing element OPD according to embodiments of the present invention may be configured such that a change in electric field between the anode AE1 and the cathode CE is used to obtain information of a user's fingerprint or information of illumination.

The encapsulation layer TFE may be disposed on the circuit layer DP_ED. The encapsulation layer TFE may include at least an inorganic or at least an organic layer. In an embodiment of the present invention, the encapsulation layer TFE may include two inorganic layers and one organic layer disposed between the two inorganic layers. In an embodiment of the present invention, the encapsulation layer TFE may include a plurality of inorganic layers and a plurality of organic layers that are alternately stacked.

The encapsulation inorganic layer may protect the emission element ED and the light sensing element OPD against moisture and oxygen, and the encapsulation organic layer may protect the emission element ED and the light sensing element OPD against foreign substances such as dust particles. The encapsulation inorganic layer may include, for example, a silicon nitride layer, a silicon oxynitride layer, a silicon oxide layer, a titanium oxide layer, or an aluminum oxide layer, but the present invention is not particularly limited thereto. The encapsulation organic layer may include an acryl-based organic layer, but the present invention is not particularly limited thereto.

Figure 5:
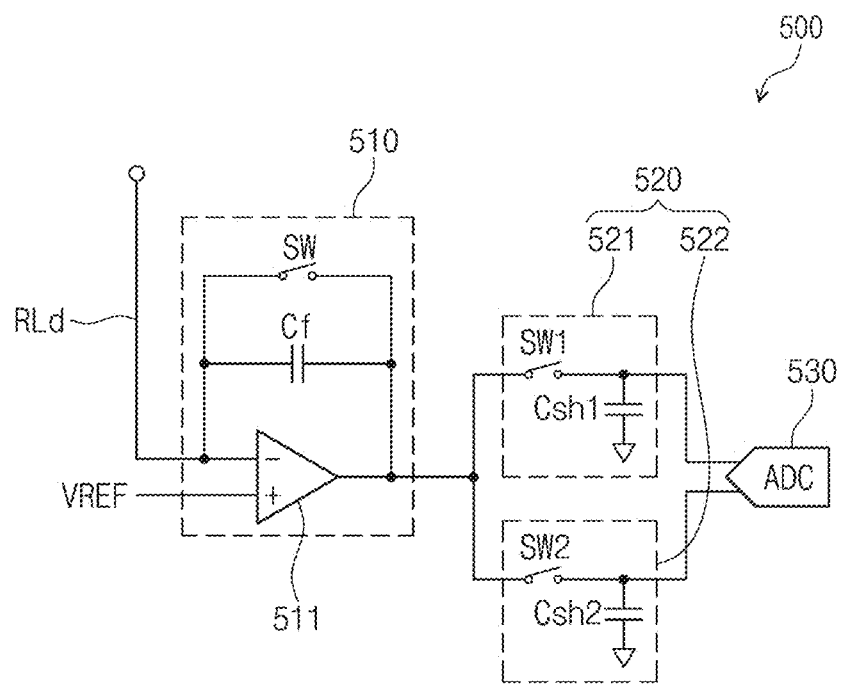
FIG. 5 illustrates a block diagram showing a sensor controller according to an embodiment of the present invention.

FIG. 5 illustrates a block diagram showing the sensor controller 500 according to an embodiment of the present invention.

Referring to FIG. 5, the sensor controller 500 (also referred to as a sensor controller circuit) may include a sensing circuit 510, a sample-and-hold unit 520 (also referred to as a sample-and-hold circuit), and an analog-to-digital converter 530 (also referred to as an analog-to-digital converter circuit).

The sensing circuit 510 may include an operational amplifier 511, a capacitor Cf, and a switch SW. A reference voltage VREF may be input to a non-inverting input end of the operational amplifier 511, and the $d^{th}$ readout line RLd may be connected to an inverting input end of the operational amplifier 511. For example, the sensing signal (see FSd of FIG. 4A) may be provided to the inverting input end of the operational amplifier 511. The capacitor Cf may be connected between the inverting input end of the operational amplifier 511 and an output end of the operational amplifier 511, and the switch SW may be connected in parallel to the capacitor Cf.

The sample-and-hold unit 520 may include a reset part 521 and a hold part 522. The reset part 521 may include a first switch SW1 and a first capacitor Csh1. The hold part 522 may include a second switch SW2 and a second capacitor Csh2.

When the first switch SW1 is turned on, the first capacitor Csh1 may be charged with a voltage that is output from the sensing circuit 510. For example, the first switch SW1 may be turned on at a timing at which the sensing signal (see FSd of FIG. 4A) does not flow through the $d^{th}$ readout line RLd. Therefore, the first capacitor Csh1 may be charged to a voltage that corresponds to noise.

When the second switch SW2 is turned on, the second capacitor Csh2 may be charged with a voltage that is output from the sensing circuit 510. The second switch SW2 may be turned on when the sensing signal (see FSd of FIG. 4A) flows through the $d^{th}$ readout line RLd. The second capacitor Csh2 may be charged to a sensing voltage including noise.

The analog-to-digital converter 530 may generate a digital value (or digital code) converted from a difference between a charge provided from the reset part 521 and a charge provided from the hold part 522. For example, the analog-to-digital converter 530 may produce a digital value based on a sensing voltage from which noise is eliminated. For example, the analog-to-digital converter 530 may convert an analog type signal provided from the sample-and-hold unit 520 to a digital type signal.

Figure 6A:
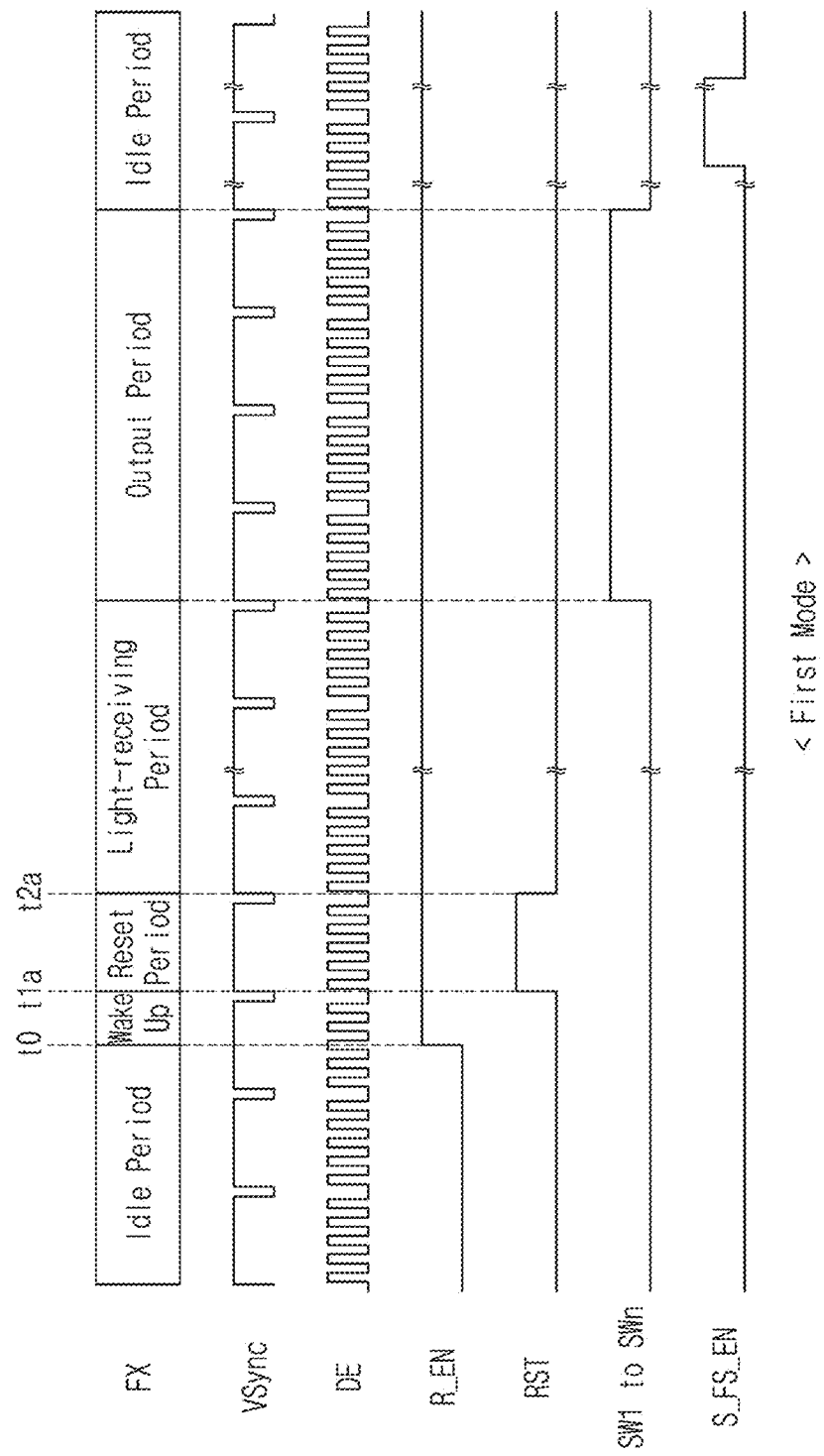
FIG. 6A illustrates a waveform diagram showing an operation of a sensor according to an embodiment of the present invention.
Figure 6B:
FIG. 6B illustrates an image obtained by a sensor operated in a first mode.

FIG. 6A illustrates a waveform diagram showing an operation of the sensor FX according to an embodiment of the present invention. FIG. 6B illustrates an image IM1 obtained by the sensor FX operated in a first mode. For example, FIG. 6A explains an operation of the sensor FX in the first mode for fingerprint detection, and FIG. 6B shows the image IM1 obtained by the operation of FIG. 6A. In the first mode, fingerprint detection may be performed only in a touching region.

Referring to FIGS. 3 and 6A, when a user executes a specific application, the display device DD may display an image for user authentication in a case where the specific application is to verify user's authentication information. When the sensors FX operate in the first mode, the sensors FX may sequentially enter a reset period, a light-receiving period (or first light-receiving period), and an output period, which will be described in detail below.

An enable signal R_EN may be activated at a time point at which an input attempt is made. The enable signal R_EN may be a signal provided from the driving controller 100 to the sensor controller 500, but the present invention is not particularly limited thereto.

When the enable signal R_EN is activated, the reset control signal RST may be activated. For example, the reset control signal RST may be produced by a combination of the enable signal R_EN and a vertical synchronization signal Vsync. The present invention, however, is not limited thereto. For example, according to embodiments, the reset control signal RST may be produced only by the enable signal R_EN, or by a combination of the enable signal R_EN and other control signal (e.g., a data enable signal DE).

As shown in FIG. 6A, after a time point t0 at which the enable signal R_EN is activated, the reset control signal RST may be activated at a first rising time point (referred to hereinafter as a reset start time point t1a) of the vertical synchronization signal Vsync and may be inactivated at a second rising time point (referred to hereinafter as a reset termination time point t2a) of the vertical synchronization signal Vsync. The activation and inactivation time points of the reset control signal RST may be variously changed without being limited to the above example. For example, after the time point to at which the enable signal R_EN is activated, the reset control signal RST may be activated at a first falling time point of the vertical synchronization signal Vsync and may be inactivated at a second falling time point of the vertical synchronization signal Vsync. FIG. 6A depicts by way of example that an activation period of the reset control signal RST corresponds to a single period of the vertical synchronization signal Vsync, and the activation period of the reset control signal RST may correspond to two or more periods of the vertical synchronization signal Vsync.

A plurality of sensors FX may be reset when receiving the reset control signal RST. The reset control signal RST may be provided in common to the plurality of sensors FX, such that the plurality of sensors FX may be reset simultaneously with each other. In this case, an activation period (e.g., a high-level period) of the reset control signal RST may be defined as a reset period of the plurality of sensors FX.

The plurality of sensors FX may be kept still in an idle period before the time point t0 (referred to as a first time point) at which an input attempt is made. When the first time point t0 and the reset start time point t1a are spaced apart at a certain time interval as shown in an embodiment of the present invention, the plurality of sensors FX may have a wake-up period between the first time point t0 and the reset start time point t1a. In contrast, when the first time point 10 coincides with the reset start time point t1a, the wake-up period may be omitted and the plurality of sensors FX may enter the reset period immediately after the idle period.

When the reset period is terminated at the reset termination time point t2a, the plurality of sensors FX may receive light to collect user information provided for a certain time duration (or the light-receiving period). For example, the light-receiving period may be a period for securely obtaining a difference in signal between a ridge and a valley of fingerprint, and a length of the light-receiving period may be about 100 ms. However, the length of the light-receiving period is not particularly limited thereto.

When a certain time elapses after the start of the light-receiving period, in response to the write scan signals SW1 to SWn (or output control signals) during the output period, the plurality of sensors FX may output readout signals through the readout lines RL1 to RLh. A length of the output period may be about 32 ms, but the present invention is not particularly limited thereto. The output period may be a portion of the light-receiving period in which light is received. For example, a time interval in one frame between a time point at which a first one of the plurality of sensors FX outputs a first readout signal and a time point at which a second one of the plurality of sensors FX outputs a last readout signal is defined as an additional light-receiving period of the second sensor.

When the output period terminates, the plurality of sensors FX may be switched to an idle period state. The sensor controller 500 may process received readout signals to generate the sensing signal S_FS, and in response to a sensing enable signal S_FS_EN, may provide the driving controller 100 with the sensing signal S_FS. When an actual input is terminated (e.g., user's touch or fingerprint detection is terminated), the specific application may terminate a collection period, and based on the sensing signal S_FS, may enter a processing period in which user's information is processed.

Figure 7A:
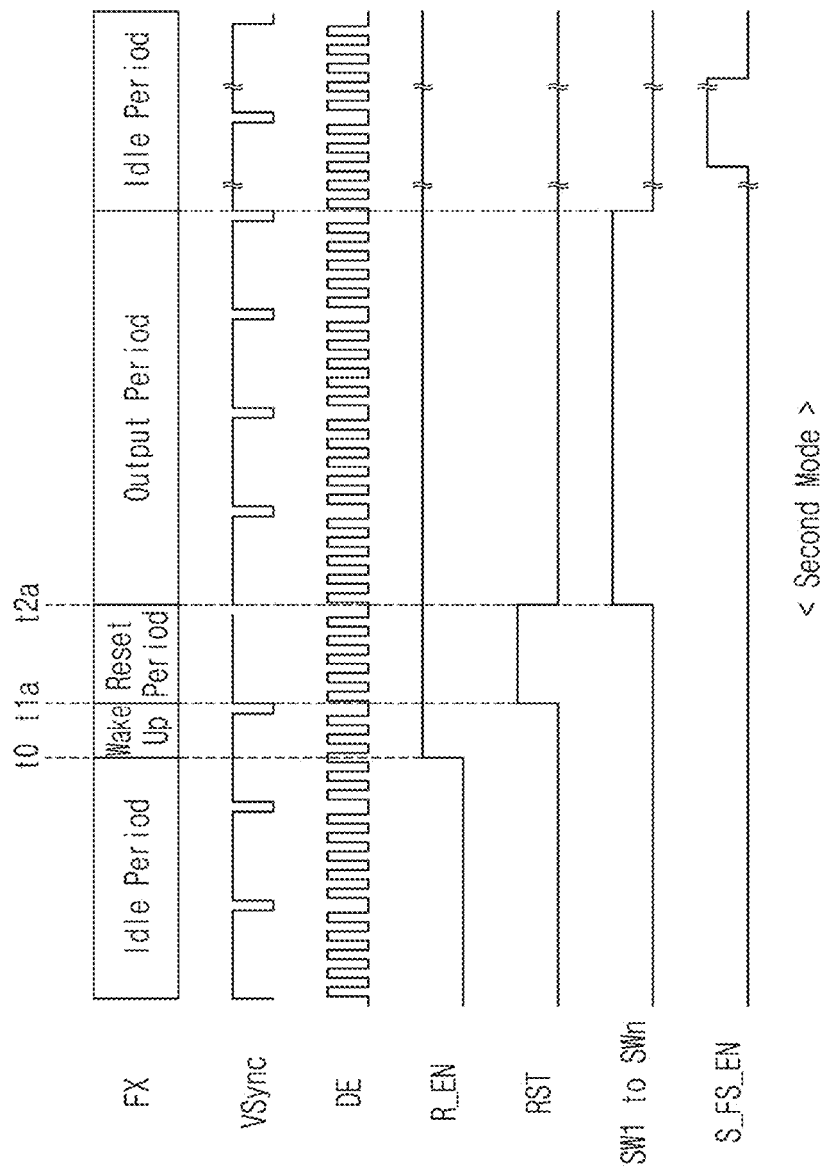
FIG. 7A illustrates a waveform diagram showing an operation of a sensor according to an embodiment of the present invention.
Figure 7B:
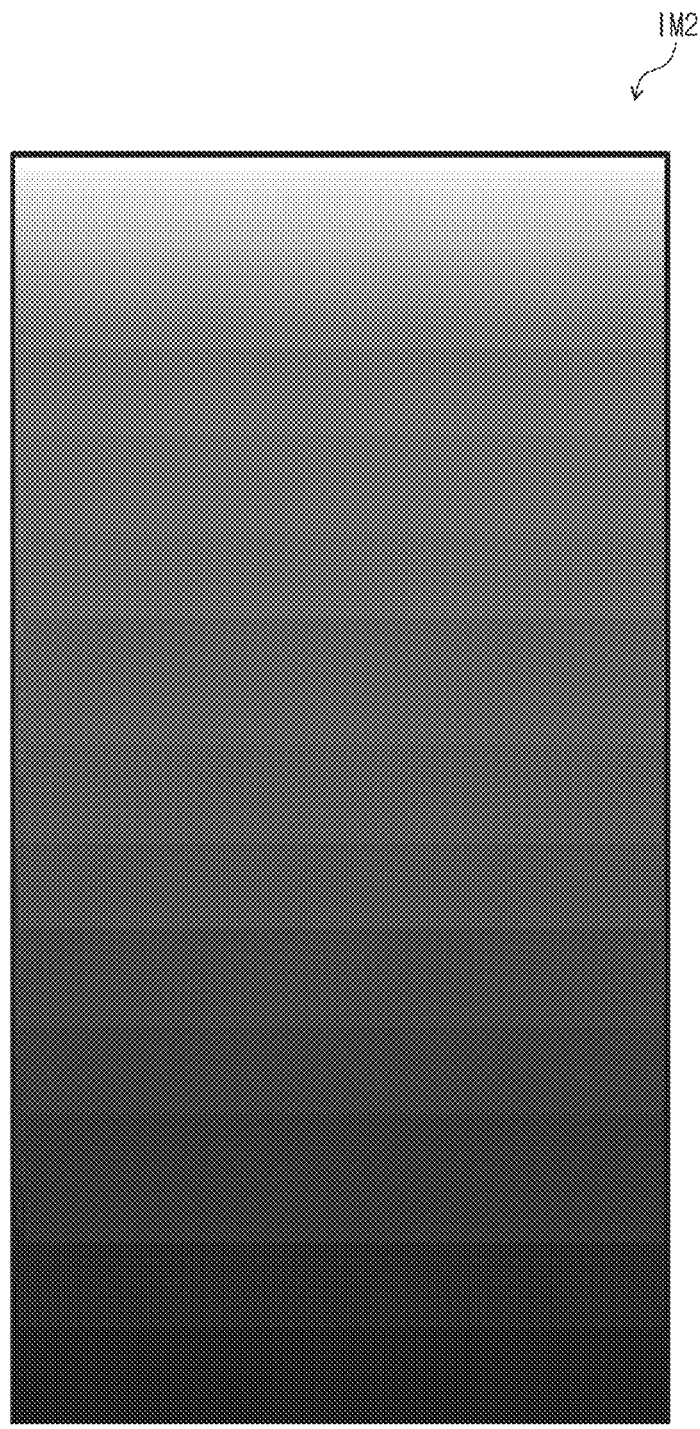
FIG. 7B illustrates an image obtained by a sensor operated in a second mode.

FIG. 7A illustrates a waveform diagram showing an operation of the sensor FX according to an embodiment of the present invention. FIG. 7B illustrates an image obtained by the sensor FX operated in a second mode. For example, FIG. 7A explains an operation of the sensor FX in a second mode for illumination detection, and FIG. 7B shows an image IM2 obtained by the operation of FIG. 7A.

Referring to FIGS. 3, 4A, and 7A, the display device DD may detect illumination by using the sensors FX that are described with reference to FIG. 6A. For example, the sensors FX may operate to measure surrounding brightness at a certain period. When the sensors FX operate in the second mode, the sensors FX may sequentially enter a reset period and an output period, which will be described in detail below.

In the case of fingerprint detection, relatively low illumination may be used to detect a difference in illumination between a ridge and a valley of a fingerprint. For example, the fingerprint detection may be performed at a first illumination range of less than about 10 lx. The surrounding brightness may have a second illumination range greater than the first illumination range. Therefore, it may be the case that the illumination detection should detect the second illumination range greater than that of the fingerprint detection. For example, the second illumination range may be from about 0 lx to about 100,000 lx.

Differently from embodiments of the present invention, when an operation (e.g., driving timing) of the sensor FX in the illumination detection is the same as that of the sensor FX in the fingerprint detection, no illumination detection may be accomplished at a specific condition. For example, when the light sensing element OPD is exposed to light with high intensity of, for example, about 1,000 lx or higher, a voltage of the first sensing node SN1 may be saturated to the second driving voltage ELVSS before the output period. In this case, the light sensing element OPD may be expressed as being discharged and a digital value may also be saturated, which may result in an acquisition of data with no discriminative power for ambient illumination.

Embodiments of the present invention suggest a driving method in which the same sensor FX is driven for both the fingerprint detection and the illumination detection. According to an embodiment of the present invention, in the case of the illumination detection, the sensors FX may enter the output period immediately after the reset period. In other words, there may be omitted the light-receiving period in which all of the sensors FX receive light at a certain time duration.

For example, in FIG. 6A, when the light-receiving period is about 100 ms and the output period is about 32 ms, a value of about 100 ms may be given as a minimum length of the light-receiving period of the sensors FX, and a value of about 132 ms may be given as a maximum length of the light-receiving period including the additional light-receiving period. In FIG. 7A, the light-receiving period may be about 0 ms, and the output period may be about 32 ms. Therefore, in the illumination detection, a value of about 0 ms may be given as a minimum length of the light-receiving period of the sensors FX, and a value of about 32 ms may be given as a maximum length of the light-receiving period of the sensors FX. Referring to the image IM2 depicted in FIG. 7B, a gradation image may be obtained due to a deviation in length of the light-receiving period in accordance with the position of each of the sensors FX.

In the illumination detection, even when the light sensing element OPD is exposed to light with high intensity, a voltage of the first sensing node SN1 may not be saturated to the second driving voltage ELVSS before the output period. Therefore, the sensor controller 500 may provide the driving controller 100 with the sensing signal S_FS with discriminative power for illumination.

FIG. 8 illustrates a waveform diagram showing an operation of the sensor FX according to an embodiment of the present invention. In the embodiment of the invention according to FIG. 8, the same components as those described in FIG. 7A will be allocated with the same reference numerals, and for convenience of explanation, a description thereof will be omitted. FIG. 8 depicts an operation of the sensor FX in the second mode for illumination detection.

Referring to FIGS. 3 and 8, when the sensors FX operate in the second mode, the sensors FX may sequentially enter a reset period, a light-receiving period (or second light-receiving period), and an output period, which will be described in detail below. Differently from the embodiment depicted in FIG. 7A, according to the embodiment of FIG. 8, when a plurality of sensors FX are used to detect illumination, the sensors FX may enter the light-receiving period after the termination of the reset period. When a certain time elapses after the start of the light-receiving period, in response to the write scan signals SW1 to SWn during the output period, the plurality of sensors FX may output readout signals through the readout lines RL1 to RLh.

There may be a difference in length between the light-receiving period in the fingerprint detection depicted in FIG. 6A and the light-receiving period in the illumination detection depicted in FIG. 8. The length of the light-receiving period in the illumination detection may be less than the length of the light-receiving period in the fingerprint detection. For example, when a value of about 100 ms is given as the length of the light-receiving period in the fingerprint detection, a value of about 16 ms may be given as the length of the light-receiving period in the illumination detection. This, however, is merely by way of example, and the length of each light-receiving period is not limited to the embodiments described above.

According to an embodiment of the present invention, a length of the light-receiving period may be differently adjusted between an operation in which a fingerprint is detected under the first illumination range of, for example, equal to or less than about 10 lx, and an illumination detection operation that detects the second illumination range from about 0 lx to about 100,000 lx greater than the first illumination range. For example, in order to detect illumination even when the light sensing element OPD is exposed to light with high intensity, a length of the light-receiving period may be adjusted less than that of the light-receiving period in the fingerprint detection.

Figure 9:
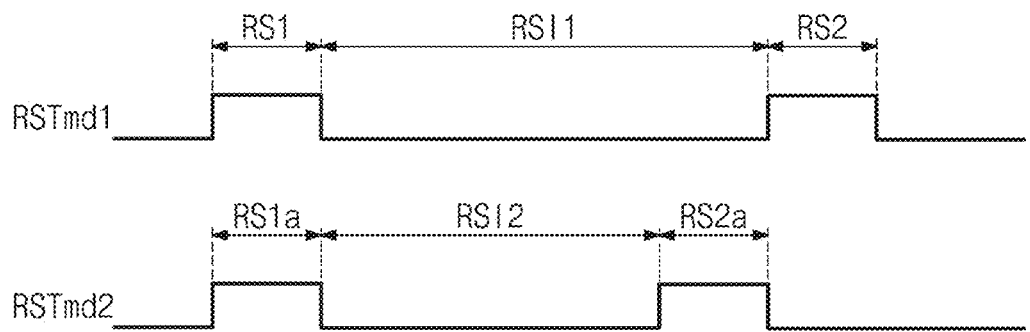
FIG. 9 illustrates a waveform diagram showing an operation of a sensor according to an embodiment of the present invention.

FIG. 9 illustrates a waveform diagram showing an operation of the sensor FX according to an embodiment of the present invention.

Referring to FIG. 9, there is an illustration of a first reset control signal RSTmd1 in the first mode for fingerprint detection and a second reset control signal RSTmd2 in the second mode for illumination detection. The first reset control signal RSTmd1 may correspond to the reset control signal RST depicted in FIG. 6A, and the second reset control signal RSTmd2 may correspond to the reset control signal RST depicted in FIG. 7A or 8.

As described above in FIGS. 7A and 8, the light-receiving period may be eliminated for the illumination detection or may be adjusted to have a length which is shorter for the illumination detection than for the fingerprint detection. A spacing between the reset period in a previous frame and the reset period in a current frame may be used to determine whether the light-receiving period is adjusted. For example, when the spacing between the reset periods is relatively short, it may be understood that the light-receiving period between the reset periods is relatively short.

The first reset control signal RSTmd1 may include a first reset period RS1 and a second reset period RS2. The first reset period RS1 may be a reset period in a previous frame of the sensor (see FXdj of FIG. 4A), and the second reset period RS2 may be a reset period in a current frame of the sensor FXdj. The second reset control signal RSTmd2 may include a third reset period RS1a and a fourth reset period RS2a. The third reset period RS1a may be a reset period in a previous frame of the sensor (see FXdj of FIG. 4A), and the fourth reset period RS2a may be a reset period in a current frame of the sensor FXdj.

An interval RSI1 between the first reset period RS1 and the second reset period RS2 may be greater than an interval RSI2 between the third reset period RS1a and the fourth reset period RS2a. Accordingly, it may be ascertained that the light-receiving period in the fingerprint detection has a time longer than that of the light-receiving period in the illumination detection.

Figure 10:
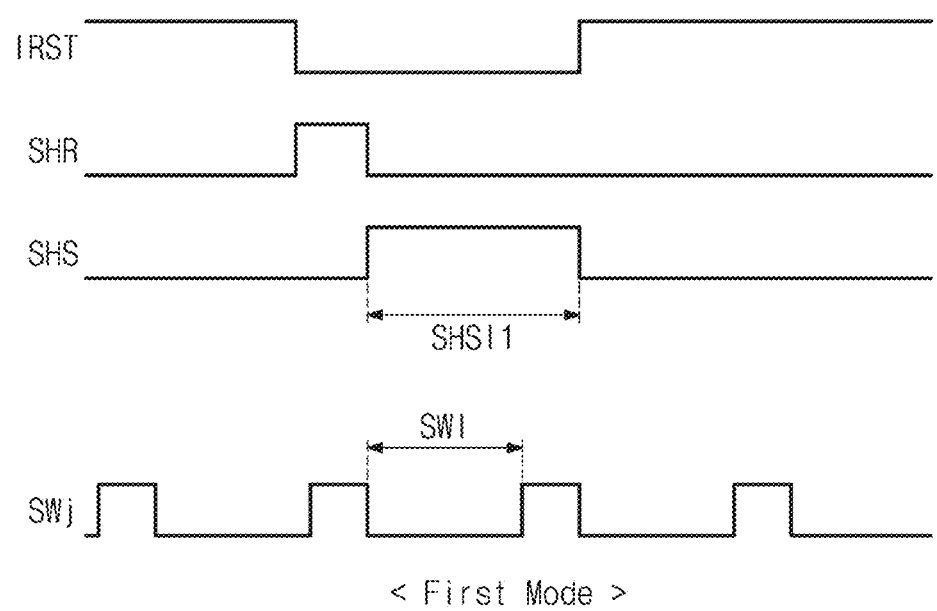
FIG. 10 illustrates a waveform diagram showing an operation of a sensor controller according to an embodiment of the present invention.

FIG. 10 illustrates a waveform diagram showing an operation of the sensor controller 500 according to an embodiment of the present invention. For example, FIG. 10 shows a waveform diagram for explaining an operation of the sensor controller 500 in the first mode for fingerprint detection. FIG. 10 depicts, by way of example, a switch signal IRST, a first switch signal SHR, a second switch signal SHS, and a $j^{th}$ write scan signal SWj (referred to hereinafter as an output control signal).

Referring to FIGS. 4A, 5, and 10, the switch signal IRST may be a signal that controls the switch SW of the sensing circuit 510, the first switch signal SHR may be a signal that controls the first switch SW1, and the second switch signal SHS may be a signal that controls the second switch SW2.

The first switch signal SHR and the second switch signal SHS may be sequentially activated. When the first switch signal SHR is activated to turn on the first switch SW1, the first capacitor Csh1 may be charged with a voltage that corresponds to noise. When the second switch signal SHS is activated to turn on the second switch SW2, the second capacitor Csh2 may be charged with a sensing voltage including noise.

The switch signal IRST may maintain an activation state in a certain period other than those in which the first switch signal SHR and the second switch signal SHS are activated. For example, the switch SW may be turned off when the first switch SW1 or the second switch SW2 is turned on, and may maintain its turned-on state in remaining periods.

A length of a period SHSI in which the second switch SHS is activated may be greater than that of a period SWI in which the output control signal SWj is activated. For example, in the first mode, an on-period length of the second switch SW2 may be greater than a length of the activation period SWI of the output control signal SWj. Therefore, the second capacitor Csh2 may be charged with all of charges that flow through the activation period SWI of the output control signal SWj. For example, in the first mode, it may be possible to detect all signals at the activation period SWI of the output control signal SWj.

Figure 11:
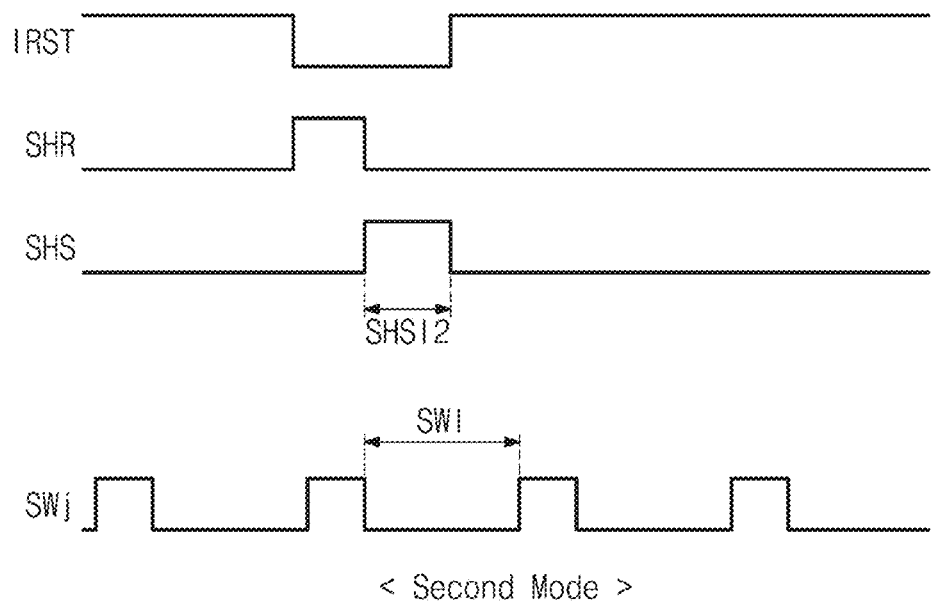
FIG. 11 illustrates a waveform diagram showing an operation of a sensor controller according to an embodiment of the present invention.

FIG. 11 illustrates a waveform diagram showing an operation of the sensor controller 500 according to an embodiment of the present invention. For example, FIG. 11 shows a waveform diagram for explaining an operation of the sensor controller 500 in the second mode for illumination detection. FIG. 11 depicts, by way of example, a switch signal IRST, a first switch signal SHR, a second switch signal SHS, and a $j^{th}$ write scan signal SWj (referred to hereinafter as an output control signal).

Referring to FIG. 11, in the second mode, a length of a period SHSI2 in which the second switch SHS is activated may be less than that of a period SWI in which the output control signal SWj is activated. In addition, the length of the activation period SHSI2 of the second switch signal SHS may be less than that of the activation period (see SHSI1 of FIG. 10) of the second switch signal SHS in the first mode for fingerprint detection.

In the illumination detection, the second capacitor Csh2 may be charged with a portion of charges flowing through the activation period SWI of the output control signal SWj. Therefore, charges provided to the second capacitor Csh2 may be interrupted before a digital value is saturated. Even when high intensity light is incident on the light sensing element OPD to induce a flow of large amount of current, the second switch SW2 may be turned off before a digital value is saturated, and thus, current transmission may be inhibited. Accordingly, the sensor controller 500 may provide the driving controller 100 with the sensing signal S_FS having discriminative power for illumination.

In the illumination detection, the sensor controller 500 may operate only in such a way according to the embodiment described with reference to FIG. 11. The present invention, however, is not necessarily limited thereto. For example, in the illumination detection, the sensor controller 500 may operate in such a way according to both the embodiment described with reference to FIG. 7A and the embodiment described with reference to FIG. 11, or according to both the embodiment described with reference to FIG. 8 and the embodiment described with reference to FIG. 11.

Figure 12:
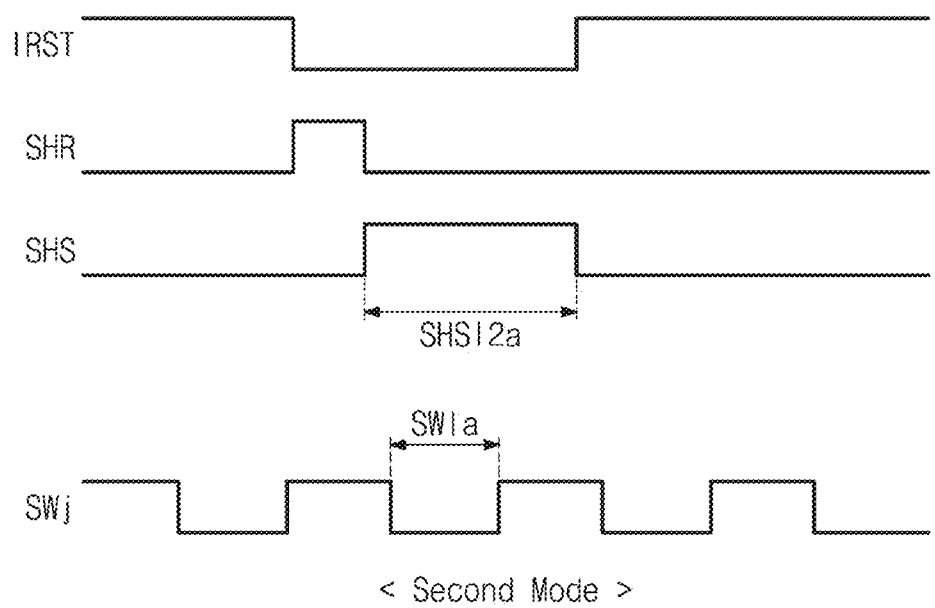
FIG. 12 illustrates a waveform diagram showing an operation of a sensor controller according to an embodiment of the present invention.

FIG. 12 illustrates a waveform diagram showing an operation of the sensor controller 500 according to an embodiment of the present invention. For example, FIG. 12 shows a waveform diagram for explaining an operation of the sensor controller 500 in the second mode for illumination detection. FIG. 12 depicts by way of example a switch signal IRST, a first switch signal SHR, a second switch signal SHS, and a $j^{th}$ write scan signal SWj (referred to hereinafter as an output control signal).

Referring to FIGS. 10 and 12, a length of a period SHSI2a in which the second switch signal SHS is activated in the second mode may be the same as that of the activation period SHSI1 of the second switch SHS in the first mode for fingerprint detection, and a length of a period SWIa in which the output control signal SWj is activated in the second mode may be less than that of the activation period SWI of the output control signal SWj in the first mode. Therefore, the length of the activation period SHSI2a of the second switch SHS may be greater than that of the activation period SWIa of the output control signal SWj.

In the illumination detection, the sensor controller 500 may operate only in such a way according to the embodiment described with reference to FIG. 12. The present invention, however, is not necessarily limited thereto. For example, in the illumination detection, the sensor controller 500 may operate in such a way according to both the embodiment described with FIG. 7A and the embodiment described with reference to FIG. 12, or according to both the embodiment described with reference to FIG. 8 and the embodiment described with reference to FIG. 12.

Figure 13A:
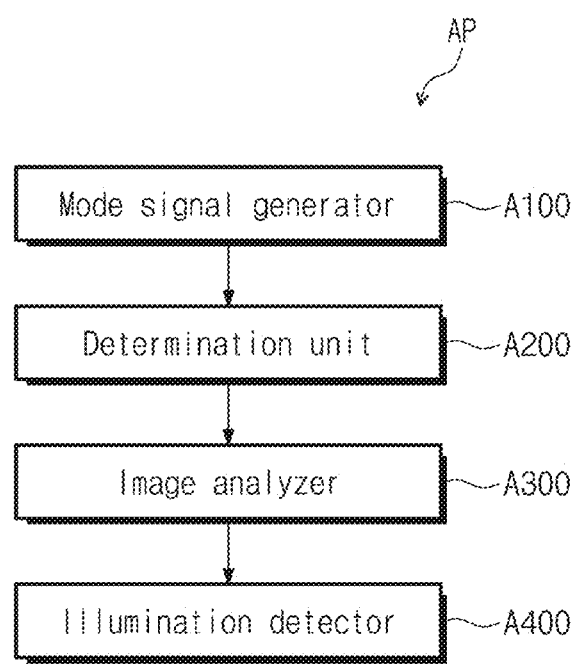
FIG. 13A illustrates a block diagram showing a processor according to an embodiment of the present invention.
Figure 13B:
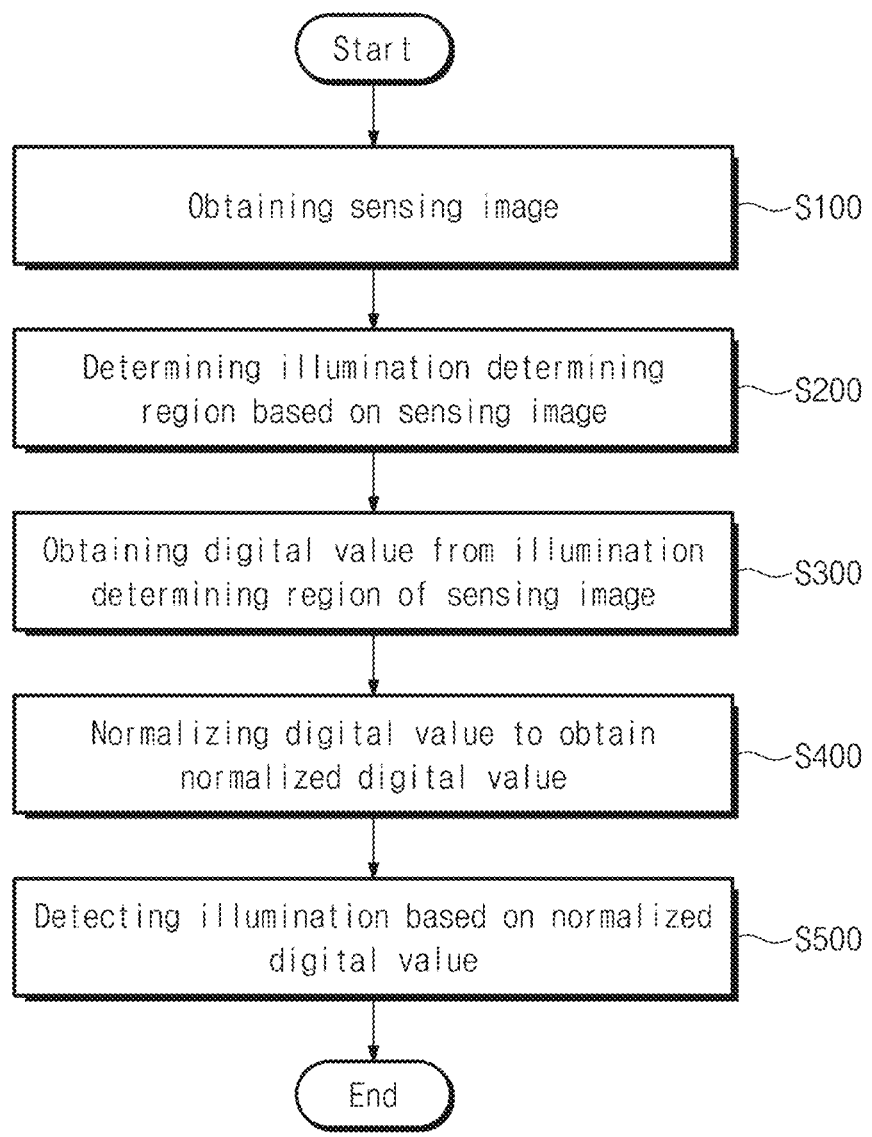
FIG. 13B illustrates a flow chart showing an operation for illumination detection according to an embodiment of the present invention.
Figure 14A:
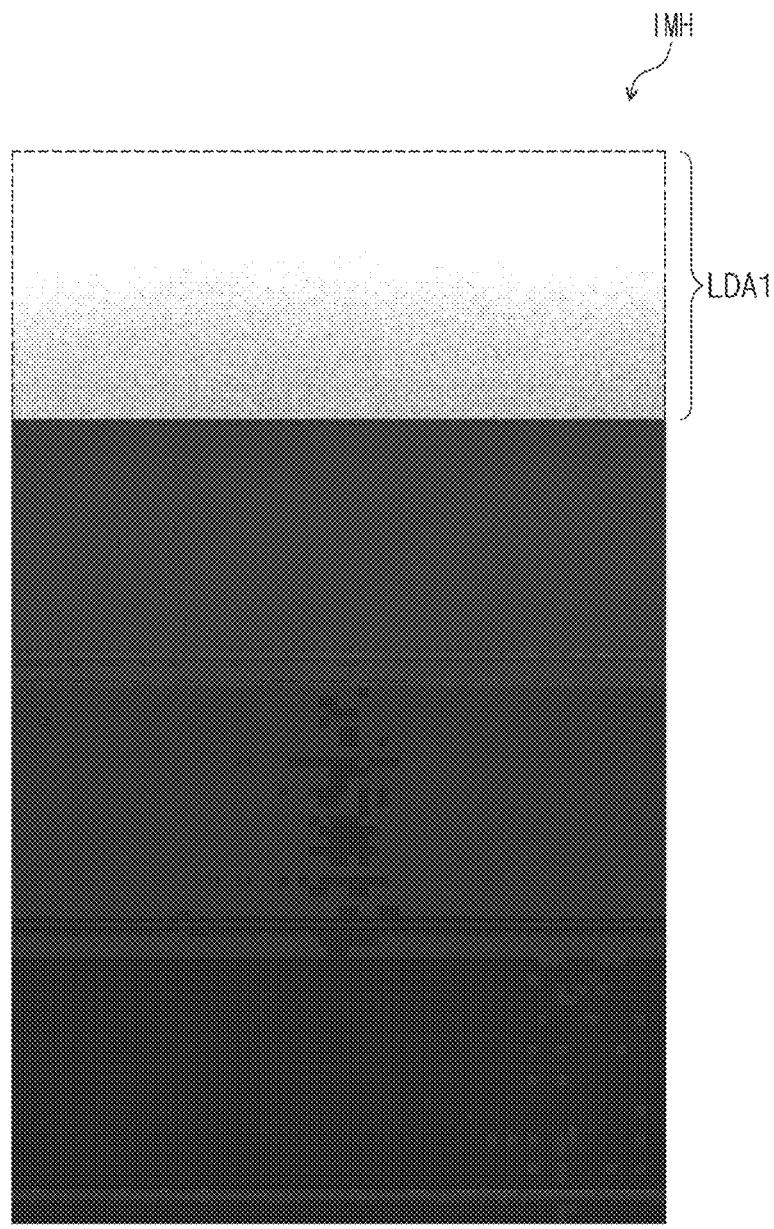
FIG. 14A illustrates an image obtained by a sensor under high illumination environment.
Figure 14B:
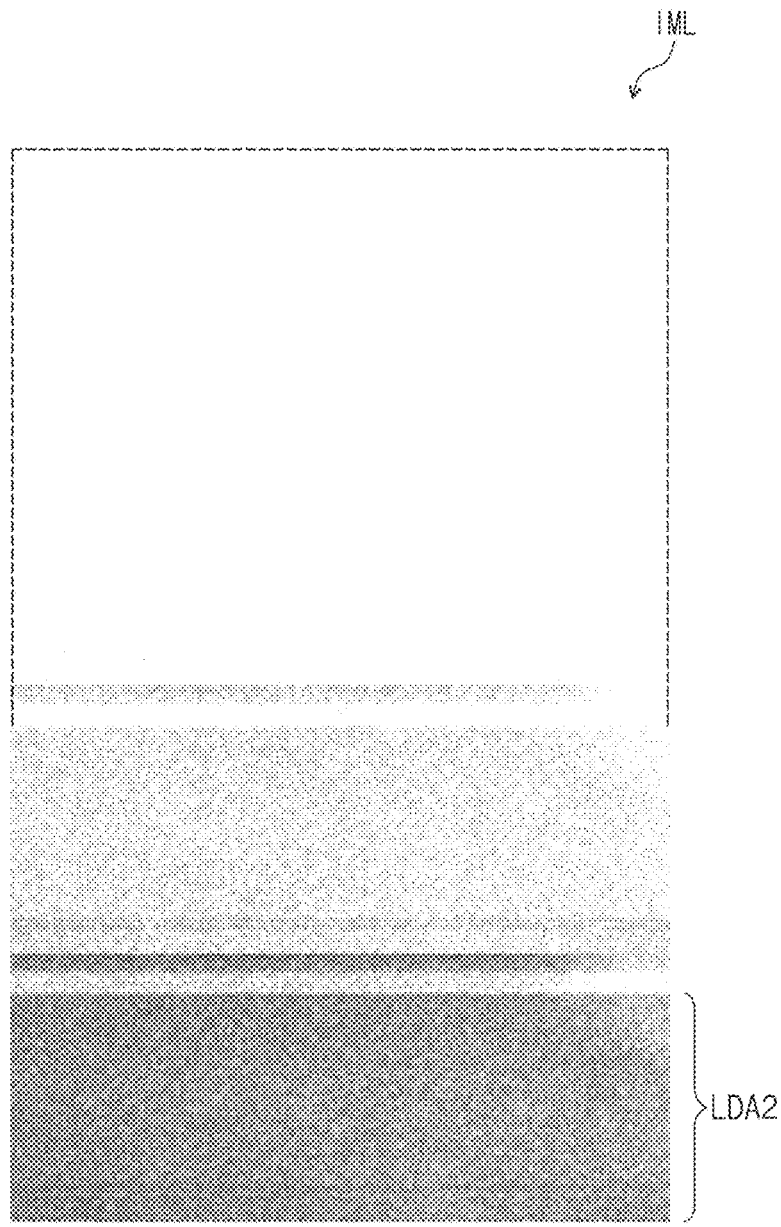
FIG. 14B illustrates an image obtained by a sensor under low illumination environment.
Figure 15:
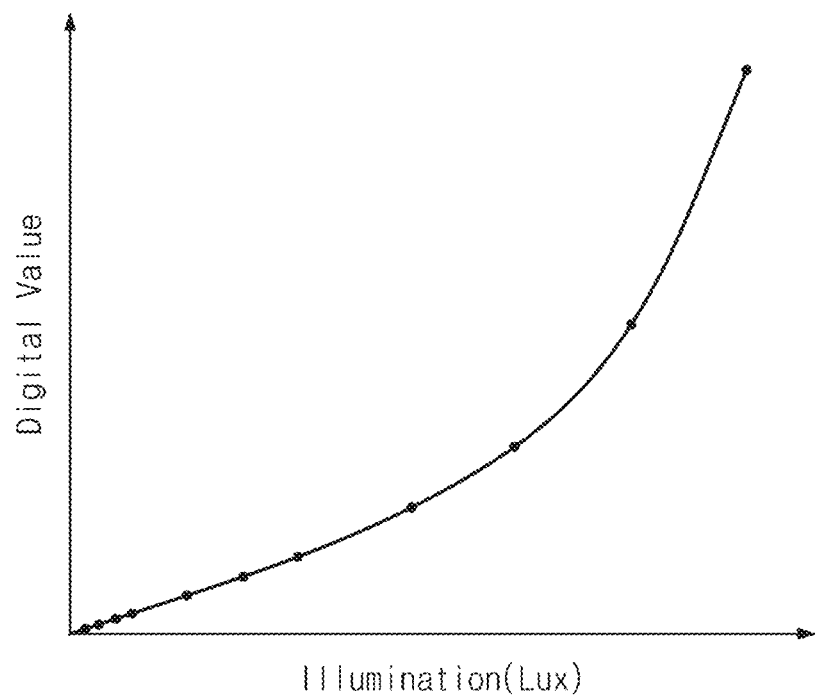
FIG. 15 illustrates a graph showing conversion between digital values and illumination according to an embodiment of the present invention.

FIG. 13A illustrates a block diagram showing a processor according to an embodiment of the present invention. FIG. 13B illustrates a flow chart showing an operation for illumination detection according to an embodiment of the present invention. FIG. 14A illustrates an image IMH obtained by a sensor under high illumination environment. FIG. 14B illustrates an image IML obtained by a sensor under low illumination environment. FIG. 15 illustrates a graph showing conversion between digital values and illumination according to an embodiment of the present invention.

Referring to FIGS. 3 and 13A, a processor AP may include a mode signal generator A100 (also referred to as a mode signal generator circuit), a determination unit A200 (also referred to as a determination circuit), an image analyzer A300 (also referred to as an image analyzer circuit), and an illumination detector A400 (also referred to as an illumination detector circuit). The mode signal generator A100 may generate a mode selection signal or mode control signal (see MCS of FIG. 3) and may provide the sensor controller 500 with the mode selection signal MCS.

Referring to FIGS. 13A and 13B, the processor AP may obtain a sensing image (S100). The determination unit A200 may determine an illumination determining region based on the sensing image obtained by a plurality of sensors FX (S200). The image analyzer A300 may obtain a digital value from the illumination determining region of the sensing image (S300). The image analyzer A300 may normalize the digital value to obtain the normalized digital value (S400). The illumination detector A400 may detect illumination based on the normalized digital value (S500).

FIG. 14A shows the sensing image IMH obtained under high illumination environment, for example, about 50,000 lx. In this case, an initially sensed region in the sensing image IMH may be determined as an illumination determining region LDA1. For example, when the sensors FX sequentially output signals in a direction from an upper end toward a lower end, a voltage of the first sensing node SN1 in each of the sensors FX disposed on the upper end may be in an unsaturated state, and a voltage of the first sensing node SN1 in each of the sensors FX disposed on the upper end may be saturated. Therefore, in the case of high illumination, an image on a relatively upper portion may be used to process data. For example, a light-receiving period of the illumination determining region LDA1 may have a length of about 0.4 ms, and a digital value obtained from the illumination determining region LDA1 may be about 30,000. The obtained digital value may be divided by the length of the light-receiving period to obtain a normalized digital value. Accordingly, the normalized digital value may be about 75,000.

FIG. 14B shows the sensing image IML obtained under a low illumination environment, for example, about 500 lx. In this case, a latterly sensed region in the sensing image IML may be determined as an illumination determining region LDA2. For example, under a low illumination environment, illumination may be detected by the sensors FX disposed on a lower end that provides data with discriminative power for illumination. For example, a light-receiving period of the illumination determining region LDA2 may have a length of about 30 ms, and a digital value obtained from the illumination determining region LDA2 may be about 25,000. The obtained digital value may be divided by the length of the light-receiving period to obtain a normalized digital value. Accordingly, the normalized digital value may be about 833.

Referring to FIGS. 13A and 15, the illumination detector A400 may include data about illumination that corresponds to a digital value. For example, the illumination detector A400 may include a lookup table having data about illumination that corresponds to a digital value. A digital value on a vertical axis of FIG. 15 may be a normalized digital value.

According to an embodiment of the present invention, the display device (see DD of FIG. 1) may analyze the sensing image IMH or IML obtained through a one-time measurement to determine the illumination determining region LDA1 or LDA2, and may measure illumination based on the determined illumination determining region LDA1 or LDA2. Accordingly, irrespective of a low or high illumination environment, illumination may be measured only from the sensing image IMH or IML obtained through a one-time measurement, and as a result, it may be possible to increase efficiency of illumination measurement.

Moreover, according to an embodiment of the present invention, the sensors FX may be used to detect a user's biometric information such as a fingerprint and to also detect illumination. Thus, embodiments may not utilize a separate illumination sensor for illumination detection, and thus, the display device (see DD of FIG. 1) may decrease in manufacturing cost.

According to the above, a display device may include a sensor, and the sensor may be used to detect a user's biometric information such as a fingerprint and to also detect illumination. Therefore, because embodiments do not utilize a separate illumination sensor for illumination detection, the display device may decrease in manufacturing cost. In addition, a sensor controller may change a driving timing for fingerprint detection and illumination detection to output a sensing signal having discriminative power for illumination. Furthermore, the display device may analyze a sensing image obtained through a one-time measurement to determine an illumination detection region, and may measure illumination based on the illumination detection region. Accordingly, irrespective of a low or high illumination environment, illumination may be measured only from the sensing image obtained through a one-time measurement, and as a result, it may be possible to increase efficiency of illumination measurement.

As is traditional in the field of the present invention, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present invention has been particularly shown and described with reference to embodiments thereof, it will be understood by those of ordinary skill in the art that various changes in form and detail may be made therein without departing from the spirit and scope of the present invention as defined by the following claims.

What is claimed is:

1. A display device, comprising:
   a display panel comprising a pixel and a sensor, the pixel comprising a pixel driving circuit and an emission element, and the sensor comprising a sensor driving circuit and a sensing element;

a driving circuit that drives the display panel, wherein the sensor selectively operates in a first mode in which a fingerprint is detected and in a second mode in which illumination is detected;

a sensing circuit that receives a sensing signal from the sensor driving circuit;

a sample-and-hold circuit that samples and holds a signal provided from the sensing circuit; and an analog-to-digital converter that converts an analog type signal provided from the sample-and-hold circuit to a digital type signal, wherein the sample-and-hold circuit comprises:
  a reset part comprising a first switch and a first capacitor; and
  a hold part comprising a second switch and a second capacitor, wherein a length of an on-period of the second switch in the first mode is greater than a length of an activation period of an output control signal received by the sensor driving circuit.

2. The display device of claim 1, wherein
in the first mode, the sensor receives light during a first light-receiving period, and
in the second mode, the sensor receives light during a second light-receiving period shorter than the first light-receiving period.

3. The display device of claim 1, wherein
in the first mode, the sensor sequentially enters a reset period, a light-receiving period, and an output period, and
in the second mode, the sensor sequentially enters a reset period and an output period.

4. The display device of claim 1, wherein
an interval in the first mode between a reset period in a previous frame of the sensor and a reset period in a current frame of the sensor is greater than an interval in the second mode between a reset period in a previous frame of the sensor and a reset period in a current frame of the sensor.

5. The display device of claim 1, wherein a first length of an on-period of the second switch in the first mode is greater than a second length of an on-period of the second switch in the second mode.

6. The display device of claim 1, wherein the sensor driving circuit comprises:
  a reset transistor comprising a first electrode that receives a reset voltage, a second electrode that is connected to a first sensing node, and a third electrode that receives a reset control signal;
  an amplification transistor comprising a first electrode that receives a sensor driving voltage, a second electrode that is connected to a second sensing node, and a third electrode that is connected to the first sensing node; and
  an output transistor comprising a first electrode that is connected to the second sensing node, a second electrode that is connected to a readout line, and a third electrode that receives the output control signal.

7. An electronic device comprising a display device, comprising:
  a display panel comprising a pixel and a sensor, the pixel comprising a pixel driving circuit and an emission element, and the sensor comprising a sensor driving circuit and a sensing element;
  a driving circuit that drives the display panel,
  wherein the sensor selectively operates in a first mode in which a fingerprint is detected and in a second mode in which illumination is detected;
  a sensing circuit that receives a sensing signal from the sensor driving circuit;
  a sample-and-hold circuit that samples and holds a signal provided from the sensing circuit; and
  an analog-to-digital converter that converts an analog type signal provided from the sample-and-hold circuit to a digital type signal,
  wherein the sample-and-hold circuit comprises:
    a reset part comprising a first switch and a first capacitor; and
    a hold part comprising a second switch and a second capacitor,
  wherein a length of an on-period of the second switch in the second mode is less than a length of an activation period of an output control signal received by the sensor driving circuit.

8. The display device of claim 6, wherein a first length of an activation period of the output control signal in the first mode is greater than a second length of an activation period of the output control signal in the second mode.

9. The display device of claim 8, wherein a first length of an on-period of the second switch in the first mode is the same as a second length of an on-period of the second switch in the second mode.

10. The display device of claim 1, further comprising:
  a processor that controls an operation of the driving circuit,
  wherein the processor provides the driving circuit with a mode control signal comprising information about an operation mode of the sensor.

11. The display device of claim 10, wherein the processor comprises:
  a determination unit configured to determine an illumination determining region based on a sensing image obtained by the sensor;
  an image analyzer configured to obtain a digital value from the illumination determining region of the sensing image, to normalize the digital value, and to obtain a normalized digital value; and
  an illumination detector configured to detect illumination based on the normalized digital value.

12. The display device of claim 1, wherein
in the first mode, the sensor detects the fingerprint using a first illumination region, and
in the second mode, the sensor detects the illumination using a second illumination region wider than the first illumination region.

13. A method of driving a display device comprising a display panel comprising a pixel and a sensor, the pixel comprising a pixel driving circuit and an emission element, and the sensor comprising a sensor driving circuit and a sensing element, the method comprising:
  receiving a mode selection signal;
  detecting a fingerprint when the mode selection signal includes information that causes the sensor to operate in a first mode;
  detecting illumination when the mode selection signal includes information that causes the sensor to operate in a second mode;
  receiving a sensing signal from the sensor driving circuit;
  sampling and holding the sensing signal; and
  converting the sensing signal from an analog type to a digital type, wherein a first length of a first period in the first mode is greater than a second length of a second period in the second mode, the sensing signal being sampled and held in each of the first period and the second period, and in the first mode, the first length of the first period is greater than a length of an activation period of an output control signal received by the sensor driving circuit.

14. The method of claim 13, wherein
when the sensor operates in the first mode, the sensor sequentially enters a reset period, a light-receiving period, and an output period, and
when the sensor operates in the second mode, the sensor sequentially enters a reset period and an output period.

15. The method of claim 13, wherein
when the sensor operates in the first mode, the sensor receives light during a first light-receiving period, and
when the sensor operates in the second mode, the sensor receives light during a second light-receiving period shorter than the first light-receiving period.

16. The method of claim 13, wherein the sensor driving circuit comprises:
a reset transistor comprising a first electrode that receives a reset voltage, a second electrode that is connected to a first sensing node, and a third electrode that receives a reset control signal;
an amplification transistor comprising a first electrode that receives a sensor driving voltage, a second electrode that is connected to a second sensing node, and a third electrode that is connected to the first sensing node; and
an output transistor comprising a first electrode that is connected to the second sensing node, a second electrode that is connected to a readout line, and a third electrode that receives an output control signal.

17. The method of claim 16, wherein a first length of an activation period of the output control signal in the first mode is greater than a second length of an activation period of the output control signal in the second mode.

18. The method of claim 13, wherein
in the second mode, the second length of the second period is less than the length of an activation period of the output control signal.

19. The method of claim 13, further comprising:
determining an illumination determining region based on a sensing image obtained by the sensor;
obtaining a digital value from the illumination determining region of the sensing image;
normalizing the digital value to obtain a normalized digital value; and
detecting illumination based on the normalized digital value.

* * * * *